United States Patent
Omura

(10) Patent No.: US 12,245,577 B2
(45) Date of Patent: Mar. 11, 2025

(54) COMPONENT FIXING TOOL FOR FISHING ROD COMPONENT, AND COMPONENT FIXING METHOD

(71) Applicant: FUJI KOGYO CO., LTD., Shizuoka (JP)

(72) Inventor: Kazuhito Omura, Shizuoka (JP)

(73) Assignee: FUJI KOGYO CO., LTD., Shizuoka (JP)

(*) Notice: Subject to any disclaimer, the term of this patent is extended or adjusted under 35 U.S.C. 154(b) by 591 days.

(21) Appl. No.: 17/647,485

(22) Filed: Jan. 10, 2022

(65) Prior Publication Data
US 2022/0272957 A1 Sep. 1, 2022

(30) Foreign Application Priority Data

Feb. 26, 2021 (KR) .................. 10-2021-0026288
Jul. 20, 2021 (KR) .................. 10-2021-0094540

(51) Int. Cl.
*A01K 87/04* (2006.01)

(52) U.S. Cl.
CPC .................. *A01K 87/04* (2013.01)

(58) Field of Classification Search
CPC ........ A01K 87/04; A01K 87/02; A01K 87/00; B65H 81/08; B65H 81/00; B65H 81/06; B65H 81/02; B65H 2701/31; D01H 7/86; D01H 7/92; D01H 1/106; D01H 7/02; D02G 1/0266; D02G 1/02; D02G 3/286; D02G 3/444; D02G 3/38; B29L 2031/7002

USPC ...... 242/439.5, 443, 437.4, 18.5, 1; 43/18.5, 43/1

See application file for complete search history.

(56) References Cited

U.S. PATENT DOCUMENTS

| | | | | |
|---|---|---|---|---|
| 3,769,736 A | * | 11/1973 | Nydam ................ | A01K 87/04 156/172 |
| 4,057,926 A | * | 11/1977 | Cordell, Jr. ........... | A01K 87/00 43/18.5 |
| 5,649,675 A | * | 7/1997 | Phelps .................. | A01K 87/04 29/564.6 |

(Continued)

FOREIGN PATENT DOCUMENTS

| | | |
|---|---|---|
| CA | 2 388 402 A1 | 11/2003 |
| CN | 1418544 A | 5/2003 |

(Continued)

*Primary Examiner* — Jeffrey R Larsen
(74) *Attorney, Agent, or Firm* — Oblon, McClelland, Maier & Neustadt, L.L.P.

(57) ABSTRACT

A component fixing tool and a component fixing method, which fix a fishing rod component to a rod body, are provided. The component fixing tool includes a wrapping portion which wraps an attachment foot of the component and the rod body and is composed of a single twist yarn. The single twist yarn is wound around the attachment foot and the rod body by a multiple number of winding turns in a state of being stretched by a tension force. A one-turn wound portion and another one-turn wound portion of the single twist yarn form an angle with respect to each other. Two adjacent one-turn wound portions of the single twist yarn are at least partially overlapped with each other. A flat outer surface portion of the wrapping portion is partially defined by outer surfaces of the two adjacent one-turn wound portions of the single twist yarn.

17 Claims, 28 Drawing Sheets

(56) References Cited

U.S. PATENT DOCUMENTS

| | | |
|---|---|---|
| 11,191,258 B2 | 12/2021 | Omura |
| 2008/0229646 A1 | 9/2008 | Huang |
| 2016/0088821 A1 | 3/2016 | Omura |
| 2022/0000088 A1* | 1/2022 | Penicka .................... C09J 7/21 |

FOREIGN PATENT DOCUMENTS

| | | | | |
|---|---|---|---|---|
| CN | 102834000 A | 12/2012 | | |
| CN | 104067993 A | 10/2014 | | |
| CN | 105307486 A | 2/2016 | | |
| CN | 110786296 A | 2/2020 | | |
| FR | 2 287 851 A1 | 5/1976 | | |
| GB | 1 397 909 A | 6/1975 | | |
| GB | 1 517 778 A | 7/1978 | | |
| JP | 2000-189009 A | 7/2000 | | |
| JP | 2001-161224 A | 6/2001 | | |
| JP | 2007-151411 A | 6/2007 | | |
| JP | 2008-211982 A | 9/2008 | | |
| JP | 2011-97836 A | 5/2011 | | |
| JP | 2014193135 A | * 10/2014 | ............ | A01K 87/04 |
| JP | 2020-18292 A | 2/2020 | | |
| JP | 2020-162471 A | 10/2020 | | |
| JP | 2021-10364 A | 2/2021 | | |
| KR | 10-0512798 B1 | 9/2005 | | |
| KR | 10-2014-0118696 A | 10/2014 | | |

\* cited by examiner

COMPONENT FIXING TOOL FOR FISHING ROD COMPONENT, AND COMPONENT FIXING METHOD

CROSS-REFERENCE TO RELATED APPLICATIONS

This application is based upon and claims the benefit of priorities from Korean Patent Application No. 10-2021-0026288, filed on Feb. 26, 2021, and Korean Patent Application No. 10-2021-0094540, filed on Jul. 20, 2021, the entire contents of which are incorporated herein by reference.

TECHNICAL FIELD

The present disclosure relates to a component fixing tool for fixing a fishing rod component, and a component fixing method.

BACKGROUND

A fishing rod includes a thin and long rod body. A fishing rod component such as a fishing line guide and a reel seat is fixed to the rod body. The fishing line guide is a component that guides a fishing line along the rod body. The reel seat is a component for mounting a reel with the fishing line wound thereon to the rod body.

The fishing rod component has an attachment foot that is brought into contact with the rod body for fixing to the rod body. By way of example, the fishing rod component is fixed to the rod body by winding a wrapping yarn around the attachment foot and the rod body and fixing the wrapping yarn, in the state where the attachment foot is in contact with an outer peripheral surface of the rod body. To enhance a fixing force of the fishing rod component, a synthetic resin material (adhesive agent) is applied on an outer surface of the wound wrapping yarn and the outer surface of the wound wrapping yarn is coated.

If a load larger than a predetermined magnitude acts in a direction toward a tip of the fishing rod, the fishing line guide may be detached from the rod body in the state of being fixed by the wrapping yarn. Accordingly, a component fixing technique should sufficiently consider the fixing strength of the fishing line guide relative to the load. Therefore, in the present technical field, various proposals have been made on the component fixing technique showing a fixing strength sufficiently withstanding the load. As one way to increase the fixing strength of the fishing line guide, it is possible to consider changing the wrapping yarn winding method and changing the synthetic resin material.

By way of example, Japanese Patent Application Publication No. 2000-189009 and Japanese Patent Application Publication No. 2020-162471 disclose a technique of winding the wrapping yarn around the attachment foot of the fishing line guide and the rod body in order to fix the fishing line guide to the rod body of the fishing rod. However, the wrapping yarn winding technique disclosed by the aforementioned patent documents needs to replace the wrapping yarn and must be performed with a large number of processes. Further, the wrapping yarn winding technique disclosed by the aforementioned patent documents makes it a condition that the wrapping yarn must be wound such that the wound portions of the wrapping yarn have a good appearance. Therefore, the wrapping yarn must be wound continuously such that there are no gaps between the wound portions of the wrapping yarn, and such that no protrusions are formed on the wound portions of the wrapping yarn. That is, it is required to continuously wind the wrapping yarn so that the respective wound portions of the wrapping yarn can be arranged and aligned in parallel in a longitudinal direction of the rod body. To satisfy such requirements, workers must wind the wrapping yarn with a delicate manipulation. Therefore, the wrapping yarn winding technique of the prior art requires the workers to have a high degree of proficiency.

FIGS. 1 to 5 show a prior art technique of fixing the fishing line guide to the rod body of the fishing rod. The example of fixing the fishing line guide to the rod body according to the prior art technique is described below with reference to FIGS. 1 to 5.

FIG. 1 is a side view showing the fishing line guide fixed to the rod body of the fishing rod according to the prior art technique. The fishing line guide 120 is fixed to the rod body 110 by winding the wrapping yarn 130 around the attachment foot 121 of the fishing line guide 120 and the rod body 110. The wrapping yarn 130 wraps the attachment foot 121 and the rod body 110 in the state of being tightly wound such that there are no gaps between adjacent wound portions of the wrapping yarn. After the wrapping yarn 130 is fixed so as to wrap the attachment foot 121 and the rod body 110, an adhesive agent is applied on the wound wrapping yarn and is then cured. The cured adhesive agent forms a coating 140 covering the wound wrapping yarn 130.

According to the prior art technique, in order for the wound portions of the wrapping yarn to show a good appearance without having gaps and protrusions, the wrapping yarn 130 must be wound around the attachment foot and the rod body while arranging and aligning the respective wound portions of the wrapping yarn in parallel in the longitudinal direction of the rod body. That is, the wrapping yarn 130 must be wound in a regularly wound form having parallel arrangement. To achieve the regularly wound form of the wrapping yarn, the prior art technique of fixing the fishing line guide to the rod body uses a folded yarn as the wrapping yarn.

FIG. 2 schematically shows a structure of the folded yarn of the prior art technique, which is used for fixing the fishing line guide to the rod body of the fishing rod. FIG. 3 illustrates the state where the folded yarn of the prior art technique shown in FIG. 2 is wound on the attachment foot. Referring to FIG. 2, the folded yarn means a yarn that is formed by twisting a plurality of single yarns 131 in one direction TD1 to make a plurality of twisted yarns 132 and then twisting such a plurality of twisted yarns 132 in a direction TD2 opposite to the initial twist direction TD1 of the twisted yarns. Since the folded yarn is composed of a plurality of single yarns and has the opposing twist directions, the folded yarn is not only difficult to be stretched but also has a cross-sectional shape that is not crushed due to its stiffness. That is, as shown in FIG. 3, if the wrapping yarn 130 of the folded yarn is wound around the attachment foot 121 and the rod body, the cross-sectional shape of the wrapping yarn 130 of the folded yarn is not crushed, and the wrapping yarn 130 of the folded yarn is wound around the attachment foot 121 and the rod body with the circular cross-sectional shape. Therefore, the wrapping yarn 130 of the folded yarn can be wound in the regularly wound form having parallel arrangement. Due to such characteristics of the wrapping yarn 130 of the folded yarn, the prior art technique of fixing the fishing line guide to the rod body uses the wrapping yarn of the folded yarn.

FIGS. 4A to 4I sequentially illustrate the processes in the prior art technique of fixing the fishing line guide to the rod body by using the wrapping yarn of the folded yarn. Referring to FIG. 4A, the attachment foot 121 of the fishing line guide 120 is brought into contact with the outer peripheral surface of the rod body 110, and a tape 11 is wound around the attachment foot 121 and the rod body 110. Next, referring to FIG. 4B, the wrapping yarn 130 is wound around the outer peripheral surface of the rod body 110 in front of a tip end of the attachment foot 121 by a predetermined winding length WL, and the initial portion of the wrapping yarn 130 is fixed by the wrapping yarn 130 wound by the winding length WL. To fix the initial portion of the wrapping yarn 130, the wrapping yarn 130 must be directly wound around the outer peripheral surface of the rod body 110 by the winding length WL in front of the tip end of the attachment foot 121. Next, referring to FIG. 4C, a portion of the initial portion of the wrapping yarn, which protrudes from the wrapping yarn wound by the aforementioned predetermined winding length WL, is cut by a cutter 12. Next, referring to FIG. 4D, the wrapping yarn 130 is wound around the attachment foot and the rod body 110 up to the position of the tape 11, and, thereafter, the tape 11 is removed. Next, referring to FIG. 4E, in the state where the wrapping yarn 130 is wound up to the middle of the attachment foot 121, a yarn loop 13 is fixed between the outermost portion of the wrapping yarn and the not-yet-wound portion of the wrapping yarn. Next, referring to FIG. 4F, the wrapping yarn 130 is wound up to the position of a base end of the attachment foot 121 while covering the yarn loop 13. Next, referring to FIG. 4G, a portion of the wrapping yarn 130 is passed through the yarn loop 13. Next, referring to FIG. 4H, the yarn loop 13 is pulled and a portion of the wrapping yarn is taken out from the wound wrapping yarn. Next, referring to FIG. 4I, a portion of the wrapping yarn protruding from the wound wrapping yarn 130 is cut by the cutter 12.

As shown in FIGS. 4A to 4I, the wrapping yarn 130 is wound around the attachment foot and the rod body in the regularly wound form having parallel arrangement so that there are no gaps and no protrusions in the wound portions of the wrapping yarn 130. To wind the wrapping yarn 130 of the folded yarn such that the wound portions of the wrapping yarn 130 and the coating formed thereon show a good appearance, it is essential that the wrapping yarn 130 is wound in the regularly wound form and an outer surface of the wound wrapping yarn 130 becomes flat. Accordingly, a worker must wind the wrapping yarn so as not to make gaps and protrusions in the wound portions of the wrapping yarn, and so as to make the wound portions of the wrapping yarn have a flat outer surface. Thus, the worker must have a high degree of proficiency in the wrapping yarn winding technique. If the worker makes a mistake in the motion of winding the wrapping yarn, irregular gaps and protrusions are formed in the wound portions of the wrapping yarn, and the outer surface of the wound portions of the wrapping yarn does not become a flat outer surface. If the worker does not have a high degree of proficiency in the technique for winding the wrapping yarn in the regularly wound form, then many gaps and protrusions are created in the wound portions of the wrapping yarn, thereby resulting in appearance faults in the process of the fixing the fishing line guide. A coating showing a good appearance cannot be formed on the wound portions of the wrapping yarn where the appearance faults occur.

FIG. 5 shows an example of the prior art technique of winding the folded yarn in the vicinity of the tip end of the attachment foot in order to fix the fishing line guide to the outer peripheral surface of the rod body. When the wrapping yarn 130 of the folded yarn is wound around the attachment foot 121 and the rod body 110 by rotating the rod body 110, it is required to wind the wrapping yarn 130 in the above-described regularly wound form so as not to create the gaps and the protrusions in the wound wrapping yarn 130. For this reason, in order that a step is not formed between the tip end 122 of the attachment foot 121 and the outer peripheral surface of the rod body 110, the tip end 122 of the attachment foot 121 is formed in a sharpened shape and the tip end portion of the attachment foot must have a smooth inclined surface 123. In addition, the advance direction of the wound wrapping yarn 130 must be an ascending direction of the inclined surface 123 (the direction of an arrow in FIG. 5) so that the wrapping yarn does not slip and fall from the inclined surface 123.

As described above and as described with reference to FIGS. 1 to 5, the prior art technique of fixing the fishing line guide to the rod body exhibits low productivity due to a large number of processes, and tends to easily cause the appearance faults in the wound portions of the wrapping yarn if a worker does not have a high degree of proficiency.

SUMMARY

Disclosed embodiments provide a component fixing tool for a fishing rod component and a component fixing method which solve at least one or more of the aforementioned problems of the prior art technique. One embodiment provides a component fixing tool and a component fixing method that do not require a worker to have a high degree of proficiency in the wrapping yarn winding technique. One embodiment provides a component fixing tool and a component fixing method, in which the wound wrapping yarn does not become loosened and the fixing force of the component is stable even if the worker does not wind the wrapping yarn with a high degree of proficiency. One embodiment provides a component fixing tool and a component fixing method, in which irregular gaps are not formed in the wound wrapping yarn and the wound wrapping yarn has a flat outer surface and a good appearance even if the worker does not wind the wrapping yarn with a high degree of proficiency. One embodiment provides a component fixing tool and a component fixing method, which can enhance an infiltration degree of a synthetic resin material between the fishing rod component and the rod body and can enhance the fixing strength of the fishing rod component. One embodiment provides a component fixing tool and a component fixing method, which do not need to use a wrapping yarn winding technique in the tip end of the attachment foot that requires a high degree of proficiency. One embodiment provides a component fixing tool and a component fixing method that can enhance productivity with the reduced number of processes.

One aspect of the disclosed embodiments relates to a component fixing tool that fixes a fishing rod component having an attachment foot to a rod body. A component fixing tool according to one embodiment includes a wrapping portion configured to wrap the attachment foot and the rod body. The wrapping portion is composed of a single twist yarn, which is wound around an outer surface of the attachment foot and an outer peripheral surface of the rod body by a multiple number of winding turns in the state where the attachment foot is placed on the outer peripheral surface of the rod body. The single twist yarn is wound in the state of being stretched by a tension force so as to have a cross-sectional shape having a width larger than a thickness. The single twist yarn is wound such that a one-turn wound portion of the single twist yarn and another one-turn wound portion of the single twist yarn form an angle with respect to each other. The wrapping portion has an overlapped portion, in which two adjacent one-turn wound portions of the single twist yarn stretched by the tension force are at least partially overlapped with each other along a longitudinal direction of the rod body, and a flat outer surface portion partially defined by outer surfaces of the two adjacent one-turn wound portions stretched by the tension force.

In one embodiment, the one-turn wound portion of the single twist yarn has a flat contact surface that is in contact with the outer surface of the attachment foot and the outer peripheral surface of the rod body by surface contact in the state of being stretched by the tension force.

In one embodiment, the wrapping portion includes an inner wrapping portion and an outer wrapping portion, which are continuously composed of a strand of the single twist yarn. The inner wrapping portion is composed of the single twist yarn, which is wound around the outer peripheral surface of the rod body with a length shorter than a length of the attachment foot by a plural number of winding turns and is fixed to the outer peripheral surface. The inner wrapping portion forms a gap between an inner surface of the attachment foot and the outer peripheral surface of the rod body. The outer wrapping portion is composed of the single twist yarn, which is wound around the inner wrapping portion, the outer surface of the attachment foot and the outer peripheral surface of the rod body by a multiple number of winding turns, and the outer wrapping portion covers and hides the inner wrapping portion.

In one embodiment, the single twist yarn in the inner wrapping portion is wound around the outer peripheral surface of the rod body so as to form a gap between the two adjacent one-turn wound portions. A cut tip end portion of the single twist yarn is fixed to the inner wrapping portion, and a cut terminal end portion of the single twist yarn is fixed to the outer wrapping portion.

In one embodiment, the outer wrapping portion has a tip end portion that has a length of more than 0 mm and less than or equal to 2 mm in a direction of being spaced away from a tip end of the attachment foot along the outer peripheral surface of the rod body.

In one embodiment, the wrapping portion has a tip end portion between a vertical surface formed in the tip end of the attachment foot and the outer peripheral surface of the rod body, and the single twist yarn is wound into a plurality of layers and is stacked in the tip end portion.

The component fixing tool of one embodiment further includes a coating portion, which is coated so as to cover the flat outer surface portion of the wrapping portion and is composed of a synthetic resin material.

A further aspect of the disclosed embodiments relates to a component fixing method of fixing a fishing rod component having an attachment foot to a rod body. A component fixing method according to one embodiment includes forming a wrapping portion configured to wrap the attachment foot and the rod body, and completing the wrapping portion. The wrapping portion is formed by winding a single twist yarn around an outer surface of the attachment foot and an outer peripheral surface of the rod body by a multiple number of winding turns in the state where the attachment foot is placed on the outer peripheral surface of the rod body while stretching the single twist yarn by a tension force such that a cross-sectional shape of the single twist yarn has a width larger than a thickness. Forming the wrapping portion is performed such that: a one-turn wound portion of the single twist yarn and another one-turn wound portion of the single twist yarn form an angle with respect to each other; an overlapped portion, in which two adjacent one-turn wound portions of the single twist yarn stretched by the tension force are at least partially overlapped with each other along a longitudinal direction of the rod body, is formed; and a flat outer surface portion, which is partially defined by flat outer surfaces of the two adjacent one-turn wound portions stretched by the tension force, is formed. The wrapping portion is completed by fixing the single twist yarn to the wrapping portion.

In one embodiment, forming the wrapping portion is performed such that the one-turn wound portion of the single twist yarn is in contact with the outer surface of the attachment foot and the outer peripheral surface of the rod body by surface contact through a flat contact surface in the state where the single twist yarn is stretched by the tension force.

In one embodiment, forming the wrapping portion is performed such that the single twist yarn is wound around the outer surface of the attachment foot and the outer peripheral surface of the rod body in any one advance direction of a first advance direction toward a tip end of the attachment foot and a second advance direction toward a base end of the attachment foot.

In one embodiment, forming the wrapping portion includes forming an inner wrapping portion, temporarily fixing the attachment foot to the outer peripheral surface of the rod body, and forming an outer wrapping portion. The inner wrapping portion is formed by winding the single twist yarn around the outer peripheral surface of the rod body with a length shorter than a length of the attachment foot by a plural number of winding turns so as to form a gap between an inner surface of the attachment foot and the outer peripheral surface of the rod body. The attachment foot is temporarily fixed by winding the single twist yarn connected from the inner wrapping portion on the outer surface of the attachment foot. The outer wrapping portion covers the inner wrapping portion, the outer surface of the attachment foot, and the outer peripheral surface of the rod body. The outer wrapping portion is formed by winding the single twist yarn, which is connected from the inner wrapping portion, around the inner wrapping portion, the outer surface of the attachment foot and the outer peripheral surface of the rod body by a multiple number of winding turns. Forming the inner wrapping portion, temporarily fixing the attachment foot, and forming the outer wrapping portion are performed by using a strand of the single twist yarn.

In one embodiment, forming the inner wrapping portion is performed so as to fix a cut tip end portion of the single twist yarn to the inner wrapping portion and so as to form a gap between the two adjacent one-turn wound portions of the single twist yarn.

In one embodiment, forming the outer wrapping portion is performed so as to form a tip end portion that has a length of more than 0 mm and less than or equal to 2 mm in a direction of being spaced away from the tip end of the attachment foot along the outer peripheral surface of the rod body.

In one embodiment, forming the wrapping portion is performed so as to form a tip end portion, which is formed by winding the single twist yarn into a plurality of layers and stacking the single twist yarn, between a vertical surface formed in the tip end of the attachment foot and the outer peripheral surface of the rod body.

In one embodiment, completing the wrapping portion includes fixing the single twist yarn to the wrapping portion by a knot.

In one embodiment, forming the wrapping portion is performed by using an auxiliary tool, which has a spool with the single twist yarn wound thereon and is configured to release the single twist yarn.

The component fixing method of one embodiment further includes forming a coating portion covering the flat outer surface portion of the wrapping portion by coating the flat outer surface portion with a synthetic resin material.

According to the component fixing tool and the component fixing method of one embodiment, the wrapping portion is composed of the single twist yarn that is wound around the attachment foot and the rod body in the state of being stretched by the tension force. The single twist yarn stretched by the tension force is wound around the outer surface of the attachment foot and the outer peripheral surface of the rod body in the state of having a crushed and flattened cross-sectional shape. The single twist yarn can be wound in the irregularly wound form such that the overlapping or crossing form of the single twist yarn is formed in the wrapping portion and the wrapping portion has the flat outer surface portion without any gap. Accordingly, the wrapping portion can show a flat and good appearance while having the overlapping or crossing form of the single twist yarn.

The wrapping portion, which is composed of the single twist yarn wound in the irregularly wound form having overlapping or crossing, can fix the attachment foot with more enhanced fixing force, and facilitates the task of easily winding the single twist yarn. Accordingly, the component fixing tool and the component fixing method according to one embodiment, which use the single twist yarn to be stretched by the tension force, do not require the worker to have a high degree of proficiency needed for winding the folded yarn in the regularly wound form. Therefore, the worker can easily and simply perform the winding task of the single twist yarn without being concerned about the overlapping of the wrapping yarn wrapping the attachment foot.

The component fixing tool and the component fixing method according to one embodiment, which use the single twist yarn to be stretched by the tension force, can realize the wrapping portion which stabilizes and enhances the fixing force of the fishing rod component and does not cause looseness in the wound single twist yarn.

The component fixing tool and the component fixing method according to one embodiment can enhance the infiltration degree of the synthetic resin material between the fishing rod component and the rod body and can exclude the winding technique in the vicinity of the tip end of the attachment foot which needs a high degree of proficiency.

The component fixing tool and the component fixing method according to one embodiment can reduce the number of the processes for winding and fixing the single twist yarn and can enhance productivity.

BRIEF DESCRIPTION OF DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

DETAILED DESCRIPTION

Embodiments of the present disclosure are illustrated for the purpose of explaining the technical idea of the present disclosure. The scope of the rights according to the present disclosure is not limited to the embodiments presented below or the detailed descriptions of such embodiments.

All technical terms and scientific terms used in the present disclosure include meanings that are commonly understood by those of ordinary skill in the technical field to which the present disclosure pertains unless otherwise defined. All terms used in the present disclosure are selected for the purpose of describing the present disclosure more clearly, and are not selected to limit the scope of the rights according to the present disclosure.

The expressions such as "comprising," "including," "having," and the like used in the present disclosure are to be understood as open-ended terms having the possibility of encompassing other embodiments, unless otherwise mentioned in the phrase or sentence containing such expressions.

The singular expressions that are described in the present disclosure may encompass plural expressions unless otherwise stated, which will also apply to the singular expressions recited in the claims.

The expressions such as "first," "second," etc. used in the present disclosure are used to separate a plurality of elements from each other, and are not intended to limit an order or importance of the elements.

In the present disclosure, the description that one element is "connected" or "coupled" to another element should be understood to indicate that the aforesaid one element may be directly connected, or coupled, to the aforesaid another element, and should be further understood that the aforesaid one element may be connected or coupled to the aforesaid another element via a new element.

The dimensional and numerical values described in the present disclosure are not limited only to the dimensional and numerical values that are described herein. Unless specified otherwise, the dimensional and numerical values may be understood to mean the described values and the equivalent ranges including the values.

Figure 6:
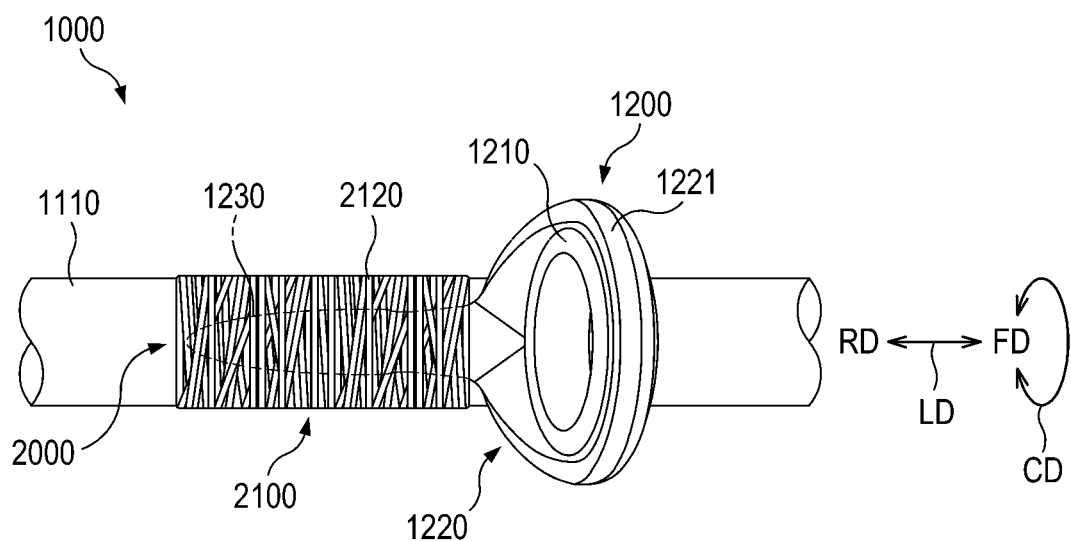
FIG. 6 is a plan view showing one example where a fishing line guide is fixed to a rod body of a fishing rod by a component fixing tool according to one embodiment.

In the present disclosure, the frontward direction means a direction directed toward a tip of a fishing rod (a direction indicated by a symbol FD in FIG. 6), while the rearward direction means a direction directed toward a butt of a fishing rod (a direction indicated by a symbol RD in FIG. 6). The longitudinal direction of a fishing rod (a direction indicated by a symbol LD in FIG. 6) includes the frontward direction and the rearward direction. The upward direction and the downward direction are based on the orientation shown in the drawings.

Descriptions are made hereinafter as to the embodiments of the present disclosure with reference to the accompanying drawings. Like reference numerals in the drawings denote like or corresponding elements. Further, in the following description of the embodiments, redundant descriptions for the same or corresponding elements may be omitted. However, even if the descriptions of the elements are omitted, such elements are not intended to be excluded in any embodiment.

Embodiments of the present disclosure relate to a component fixing tool, which is configured to fix a fishing rod component to a rod body of a fishing rod, and a component fixing method of fixing the fishing rod component to the rod body of the fishing rod. The component fixing tool and the component fixing method according to the embodiments can firmly fix the fishing rod component to the rod body of the fishing rod by means of at least one strand of a single twist yarn.

Figure 7:
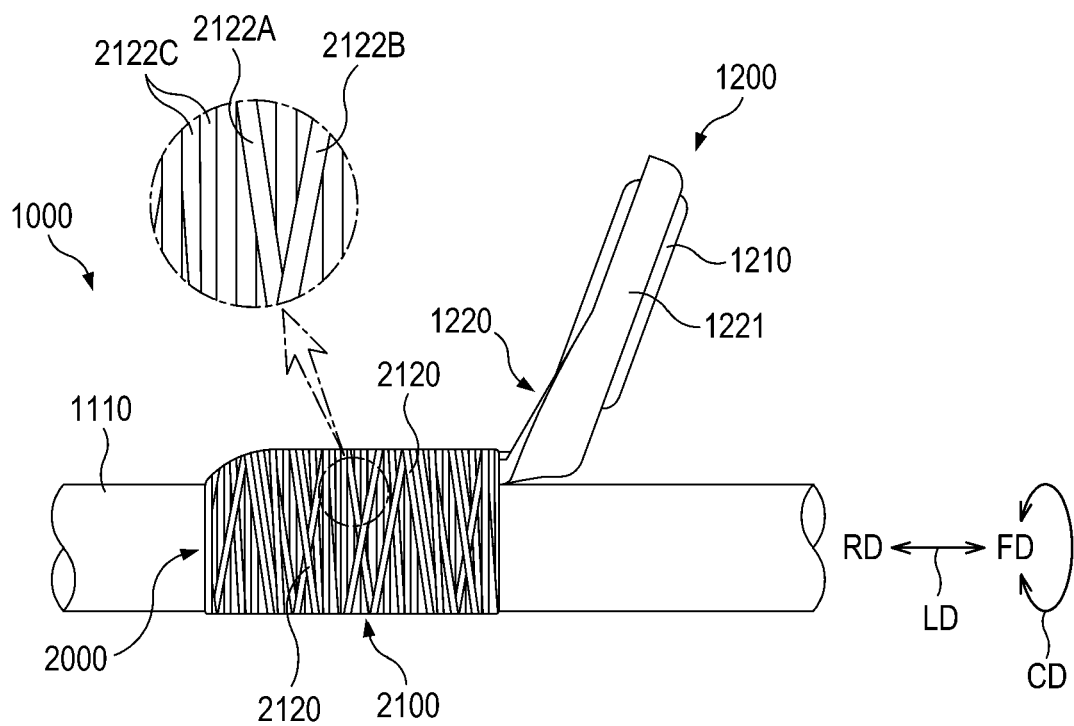
FIG. 7 is a side view showing the fishing line guide and the component fixing tool shown in FIG. 6.
Figure 8:
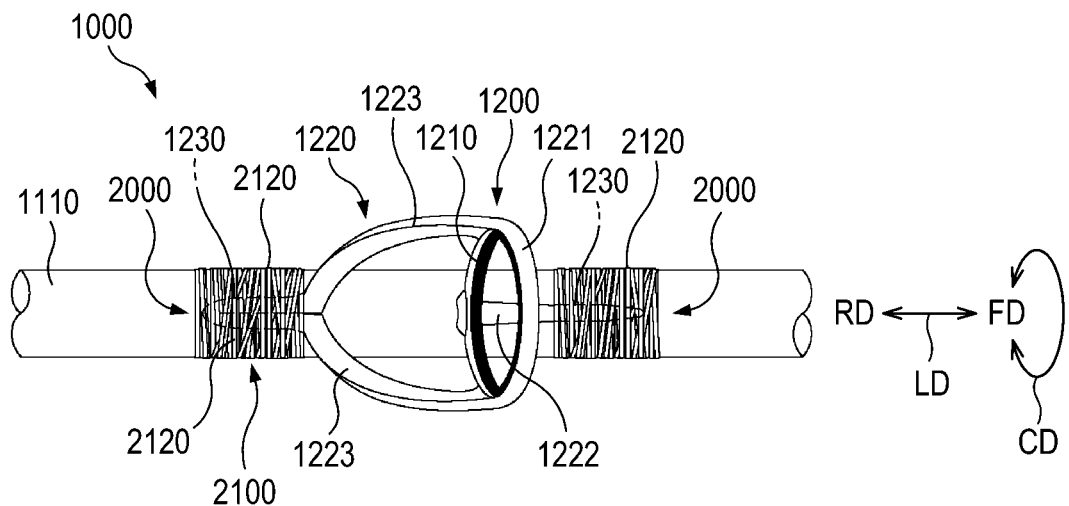
FIG. 8 is a plan view showing another example where a fishing line guide is fixed to a rod body of a fishing rod by a component fixing tool according to one embodiment.
Figure 9:
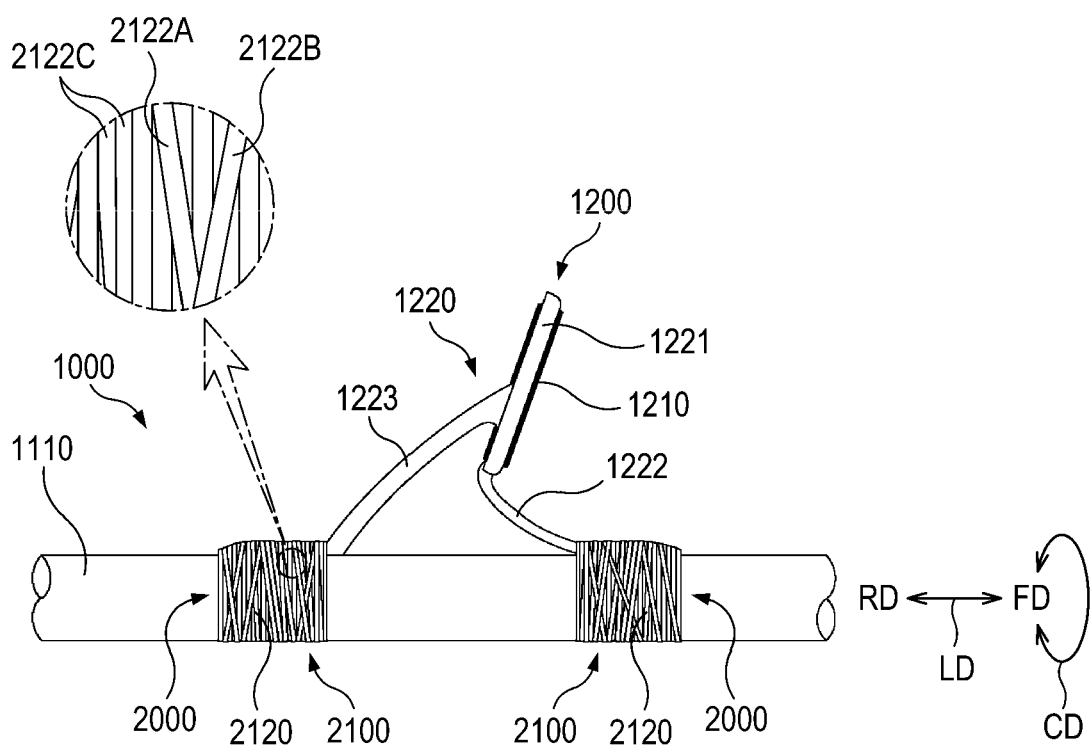
FIG. 9 is a side view showing the fishing line guide and the component fixing tool shown in FIG. 8.
Figure 10:
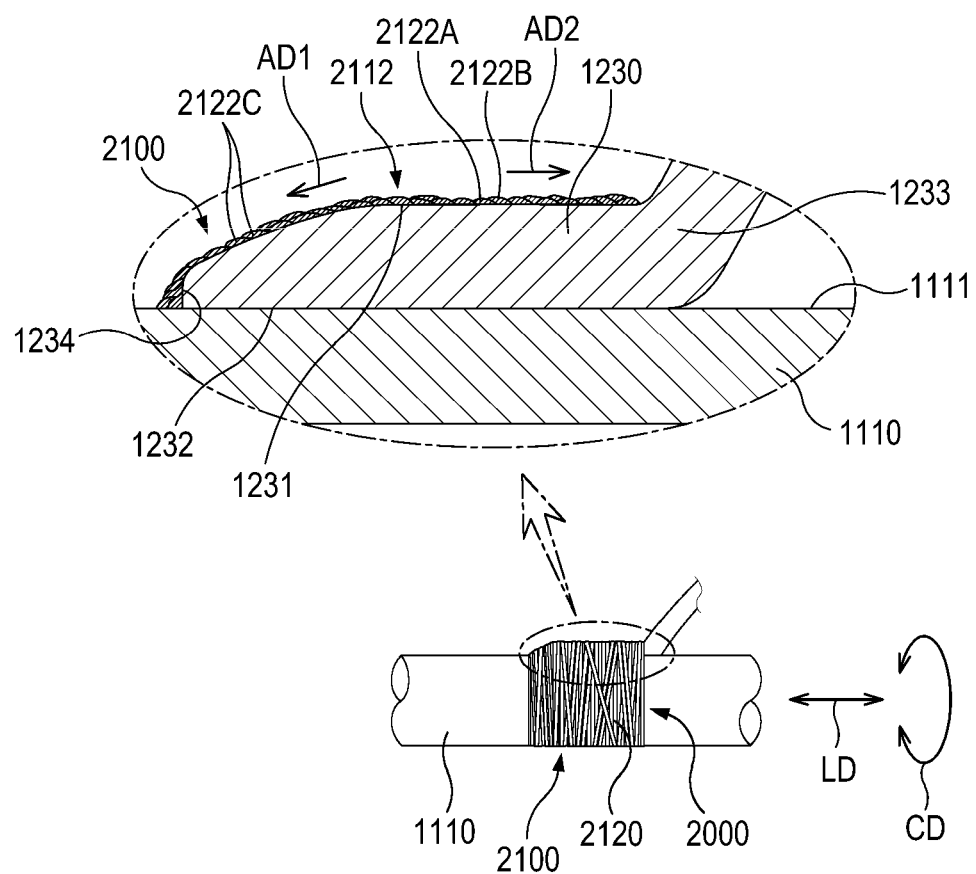
FIG. 10 shows a wrapping portion of the component fixing tool according to one embodiment and a partial cross-sectional shape of the wrapping portion.
Figure 11:
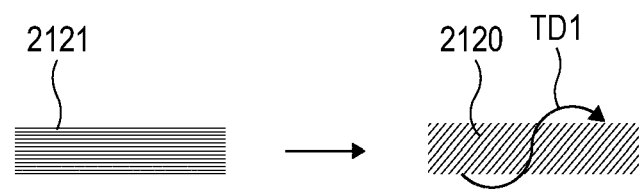
FIG. 11 schematically illustrates a structure of a single twist yarn that the component fixing tool according to one embodiment uses.
Figure 12:
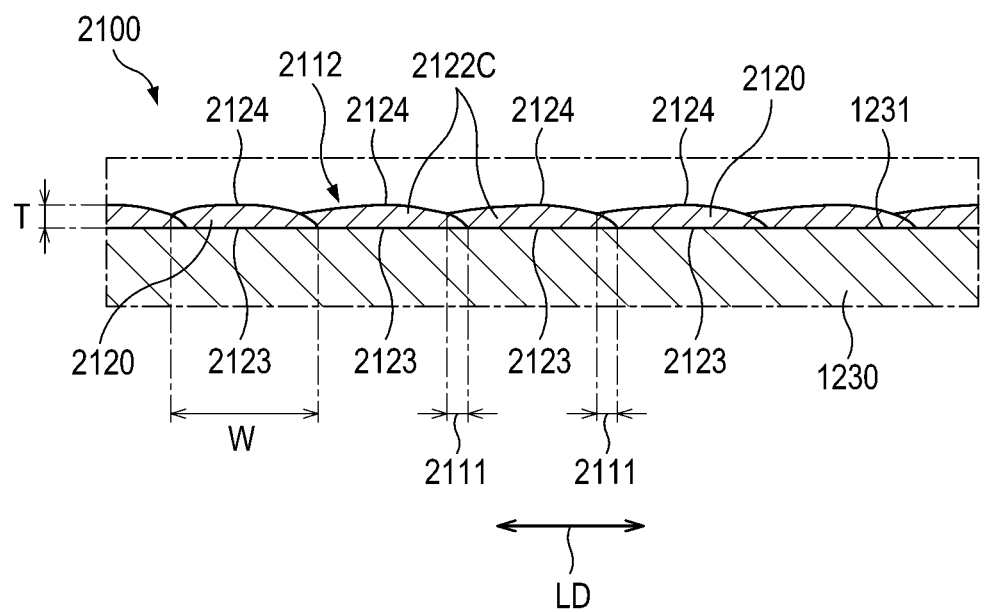
FIG. 12 is a cross-sectional view schematically showing a state where a single twist yarn is wound on an outer surface of an attachment foot in the component fixing tool according to one embodiment.
Figure 13:
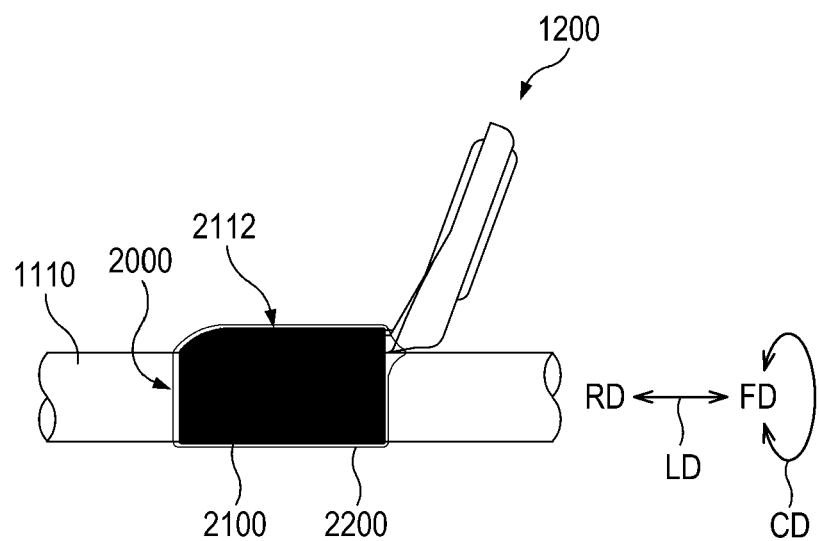
FIG. 13 is a side view showing a state where a coating portion is formed on the wrapping portion shown in FIG. 6.
Figure 14:
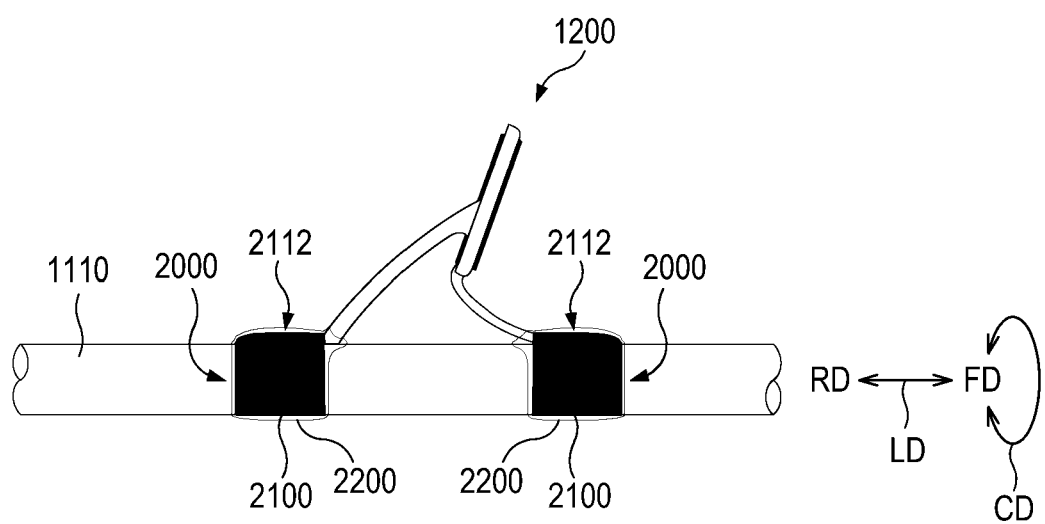
FIG. 14 is a side view showing a state where a coating portion is formed on the wrapping portion shown in FIG. 8.

Reference is made to FIGS. 6 to 14 as to a component fixing tool according to one embodiment of the present disclosure. FIGS. 6 and 7 are a plan view and a side view, respectively, showing one example where a fishing line guide is fixed to a rod body of a fishing rod by the component fixing tool according to one embodiment. FIGS. 8 and 9 are a plan view and a side view, respectively, showing another example where a fishing line guide is fixed to a rod body of a fishing rod by the component fixing tool according to one embodiment. FIG. 10 shows a wrapping portion of the component fixing tool according to one embodiment and a partial cross-sectional shape of the wrapping portion. FIG. 11 schematically illustrates structure of a single twist yarn that the component fixing tool according to one embodiment uses. FIG. 12 is a cross-sectional view schematically showing a state where a single twist yarn is wound on an outer surface of an attachment foot in the component fixing tool according to one embodiment. FIGS. 13 and 14 each show a state where a coating portion is formed on the wrapping portion of the component fixing tool according to one embodiment.

Referring to FIGS. 6 to 9, a fishing rod 1000 includes a rod body 1110 which is a structure that maintains a thin and long shape of the fishing rod and is capable of elastically deforming. The rod body 1110 may be a thin and long tubular member or may be a cylindrical member that is thin and long but is solid. The fishing rod 1000 may include a plurality of rod bodies 1110. The plurality of rod bodies may be connected sequentially by a connection type such as a joined type or a telescopic type, thus constituting a main body of the fishing rod.

The fishing rod 1000 includes a fishing rod component to be fixed to the rod body 1110. The fishing rod component may include a reel seat (not shown) for attaching a reel, and a fishing line guide for guiding a fishing line. The reel seat may be fixed to the rod body located at a butt side of the fishing rod. A reel for reeling out a fishing line (not shown) or winding the fishing line is removably mounted on the reel seat. The fishing line guide may be fixed to the rod body located at the butt side of the fishing rod, the rod body located at the tip side of the fishing rod, and the rod body located between the butt side and the tip side. The fishing line guide guides the fishing line which is reeled out from the reel when casting a fishing rig connected to an end of the fishing line or is wound on the reel when landing a fish.

According to the embodiments, the fishing rod component can be firmly fixed to an outer peripheral surface of the rod body 1110 by using the single twist yarn. The fishing rod component has an attachment foot to be placed on the outer peripheral surface of the rod body 1110, so that the fishing rod component can be fixed to the outer peripheral surface of the rod body 1110. As one example of the fishing rod component in the embodiments described below, a fishing line guide 1200 is fixed to the rod body 1110. Further, the reel seat having the above mentioned attachment foot may be fixed to the rod body 1110 in accordance with the embodiments of the present disclosure.

As shown in FIGS. 6 and 8, the fishing line guide 1200 includes a guide ring 1210 configured to allow the fishing line to pass therethrough, and a frame 1220 supporting the guide ring 1210 and attached to the rod body 1110. The guide ring 1210 may be made of a ceramic material. The frame 1220 may be made of a metallic material.

The frame 1220 of the fishing line guide shown in FIG. 6 has a ring holding portion 1221 holding the guide ring 1210, and an attachment foot 1230 extending from the ring holding portion 1221 and bent with respect to the ring holding portion 1221. The fishing line guide 1200 shown in FIG. 6 has one attachment foot 1230. The frame 1220 of the fishing line guide shown in FIG. 8 has the ring holding portion 1221, support legs 1222 and 1223 extending from the ring holding portion 1221, and an attachment foot 1230 extending from each of the support legs 1222 and 1223 and bent with respect to the support leg. The fishing line guide 1200 shown in FIG. 8 has two attachment feet 1230. That is, one front support leg 1222 and a pair of rear support legs 1223 are provided in the frame 1220, and the attachment foot 1230 is provided in the front support leg 1222 and the rear support legs 1223. The fishing line guides shown in FIGS. 6 and 8 are fixed to the rod body 1110 in the state where their attachment feet are fixed to the outer peripheral surface of the rod body 1110 by a component fixing tool 2000 according to one embodiment.

The attachment foot 1230 of the fishing line guide may be integrally formed with the frame 1220, and is formed so as to be placed on the outer peripheral surface of the rod body 1110. The attachment foot of the fishing line guide takes the form of a flat plate having a predetermined thickness. Referring to FIG. 10, the attachment foot 1230 of the fishing line guide has an outer surface 1231 and an inner surface 1232. The outer surface 1231 is an outward surface of the attachment foot in the state where the attachment foot is placed on an outer peripheral surface 1111 of the rod body (i.e., the surface of the attachment foot positioned in a radially outward direction with reference to a center of the rod body). The inner surface 1232 is a surface of the attachment foot that faces toward the outer peripheral surface 1111 of the rod body. The outer surface 1231 and the inner surface 1232 may include a flat surface or a curved surface. Further, the attachment foot 1230 has a base end 1233 and a tip end 1234. The base end 1233 is connected to the frame 1220 shown in FIG. 6, or to the support legs 1222 and 1223 of the frame shown in FIG. 8. The tip end 1234 is located opposite to the base end 1233 in a longitudinal direction LD of the rod body.

The component fixing tool 2000 according to one embodiment is configured to fix the the attachment foot 1230 of the fishing line guide (i.e., the fishing rod component) to the rod body 1110 by means of the single twist yarn. The component fixing tool 2000 may mean a fixing object, a fixing structure, or a fixing device which is configured to fix the fishing rod component to the rod body.

Referring to FIGS. 6 to 10, the component fixing tool 2000 comprises a wrapping portion 2100 composed of the single twist yarn 2120. The wrapping portion 2100 is configured to wrap the attachment foot 1230 and the rod body 1110. The wrapping portion 2100 is formed by winding the single twist yarn around the outer surface 1231 of the attachment foot and the outer peripheral surface 1111 of the rod body along the longitudinal direction LD of the rod body in a circumferential direction CD of the rod body by a multiple number of winding turns. Hereinafter, a portion of the single twist yarn 2120 where the single twist yarn is wound by one winding turn is referred to as a one-turn wound portion of the single twist yarn. Accordingly, the wrapping portion 2100 is a wound object of the single twist yarn where respective one-turn wound portions of the single twist yarn are continuously arranged along the longitudinal direction of the rod body. The fishing line guide 1200 is firmly fixed to the rod body 1110 by the wrapping portion 2100 that wraps the attachment foot 1230 and the rod body 1110 together.

The fishing line guide 1200 may be firmly fixed to the rod body 1110 by winding the single twist yarn 2120 around the outer surface 1231 of the attachment foot and the outer peripheral surface 1111 of the rod body. By way of example, the attachment foot 1230 may be firmly fixed to the rod body 1110 through the wrapping portion 2100 by winding the single twist yarn 2120 around the outer surface 1231 of the attachment foot and the outer peripheral surface 1111 of the rod body, which is not covered by the attachment foot, by a multiple number of winding turns and forming the wrapping portion 2100.

Any one of polyester, nylon, or silk may be selected as a material of the single twist yarn 2120 constituting the wrapping portion, but the material of the single twist yarn is not limited thereto. Referring to FIG. 11, the single twist yarn 2120 forming the wrapping portion means a yarn which is formed by twisting a strand of single yarn in any one direction TD1 of left and right directions, or a yarn which is formed by arranging two or more single yarns and then twisting the same in any one direction TD1 of left and right directions. Such a single twist yarn can be easily stretched in its longitudinal direction. As the single twist yarn is stretched, a cross-sectional shape of the single twist yarn can be deformed into a crushed and flattened shape. That is, the cross-sectional shape of the single twist yarn stretched by a tension force can be deformed so as to have a width larger than a thickness. For example, the cross-sectional shape of the single twist yarn stretched by a tension force may take a shape such as a thin elliptical shape and a thin rectangular shape where a thickness dimension is small but a width dimension is several times larger than the thickness dimension. In this regard, the aforementioned thickness dimension may mean the dimension of the cross-sectional shape of the single twist yarn in a direction perpendicular to a surface contacting the single twist yarn, and the aforementioned width dimension may mean the dimension of the cross-sectional shape of the single twist yarn in a direction parallel to the surface contacting the single twist yarn. If the single twist yarn is stretched by a tension force, the single twist yarn has a flattened cross-sectional shape that has a thickness dimension smaller than its original thickness dimension and a width dimension larger than its original width dimension. Accordingly, the single twist yarn in the stretched state can make contact with the outer surface of the attachment foot and the outer peripheral surface of the rod body with a wider contact area, and the adjacent one-turn wound portions can be overlapped with a small thickness.

The wrapping portion of the component fixing tool according to one embodiment is described below with reference to FIGS. 6 to 12.

A strand of the single twist yarn 2120 is continuously wound around the outer surface 1231 of the attachment foot and the outer peripheral surface 1111 of the rod body, and therefore may form the wrapping portion 2100. According to one embodiment, the single twist yarn 2120 of the wrapping portion 2100 is wound around the outer surface of the attachment foot and the outer peripheral surface of the rod body by a multiple number of winding turns in the state of being stretched by a tension force. That is, as shown in FIG. 12, the single twist yarn 2120 is wound in the state of being stretched by a tension force so as to have the cross-sectional shape having a width W larger than a thickness T. Therefore, the cross-sectional shape of the single twist yarn in the wrapping portion 2100 takes the crushed and flattened shape.

Referring to FIGS. 7 and 9, the single twist yarn 2120 in the wrapping portion is wound such that a one-turn wound portion 2122A and another one-turn wound portion 2122B form an angle therebetween or cross each other along the circumferential direction CD of the rod body. Therefore, the one-turn wound portion 2122A and the another one-turn wound portion 2122B of the single twist yarn 2120 are at least partially overlapped with or cross each other. That is, the single twist yarn 2120 in the wrapping portion is wound in the state of being stretched by a tension force such that the respective one-turn wound portions 2122A and 2122B are overlapped with each other along the longitudinal direction LD. Since the one-turn wound portions are overlapped with each other in the single twist yarn 2120 of the wrapping portion, the wrapping portion is capable of fixing the attachment foot to the rod body with more enhanced fixing force. Further, it becomes difficult for the respective one-turn wound portions of the single twist yarn in the wrapping portion to slip with respect to each other, and it becomes difficult for the single twist yarn in the wrapping portion to become loosened. As such, a wound form of the single twist yarn 2120 in the wrapping portion is not a regularly wound form, but an irregularly wound form. The aforementioned regularly wound form may mean a wound form where the one-turn wound portion and the another one-turn wound portion immediately adjacent thereto are arranged in parallel without any overlap in the longitudinal direction of the rod body. The aforementioned irregularly wound form may mean a wound form where the one-turn wound portion and the one-turn wound portion immediately next thereto are overlapped with or cross each other in the longitudinal direction of the rod body, or may mean a wound form where the one-turn wound portion and the one-turn wound portion spaced away therefrom cross each other. Further, the one-turn wound portion and the another one-turn wound portion may be positioned in parallel with each other in some section of the wound single twist yarn.

Since the single twist yarn 2120 stretched by a tension force is wound around the attachment foot and the rod body in the irregularly wound form, the wrapping portion 2100 has an overlapped portion. As shown in FIG. 12, in the overlapped portion 2111 of the wrapping portion, two adjacent one-turn wound portions 2122C of the single twist yarn stretched by a tension force are overlapped with each other at least partially along the longitudinal direction LD of the rod body. The overlapped portion 2111 may be defined as an overlapped area formed between one lateral edge of one of the two adjacent one-turn wound portions 2122C and the opposite lateral edge of the other one-turn wound portion adjacent to the aforesaid one. Accordingly, the wrapping portion 2100 can have a large number of overlapped portions 2111.

The single twist yarn stretched by a tension force has the crushed and flattened cross-sectional shape, and therefore can have a wider contact surface area. Therefore, due to the crushed and flattened cross-sectional shape, the single twist yarn can have a flat contact surface that is in contact with the outer surface of the attachment foot and the outer peripheral surface of the rod body by surface contact. As shown in FIG. 12, in the state of being stretched by a tension force, each of the one-turn wound portions of the single twist yarn has a flat contact surface 2123 that is in contact with the outer surface 1231 of the attachment foot and the outer peripheral surface of the rod body. The flat contact surface 2123 adjoins the overlapped portion 2111 and is in contact with the outer surface 1231 of the attachment foot and the outer peripheral surface of the rod body by surface contact.

Since the single twist yarn stretched by a tension force has the crushed and flattened cross-sectional shape, the one-turn wound portion of the single twist yarn has a flat outer surface 2124, as shown in FIG. 12. The flat outer surface 2124 of the one-turn wound portion partially defines an outer surface portion of the wrapping portion 2100. As shown in FIGS. 10 and 12, since the single twist yarn stretched by a tension force has the crushed and flattened cross-sectional shape, the wrapping portion 2100 has a flat outer surface portion 2112 that is approximately flat, notwithstanding the presence of the overlapped portion 2111. The flat outer surface portion 2112 may be partially defined by the flat outer surfaces 2124 of the two adjacent one-turn wound portions 2122C stretched by a tension force. Therefore, although the single twist yarn 2120 is wound in the wrapping portion such that the respective one-turn wound portions are partially overlapped with each other, the wrapping portion 2100 can have the flat outer surface portion 2112 which has no gap and is approximately flat. The flat outer surface portion 2112 becomes an outer surface of a cylindrical shape of the wrapping portion 2100.

Referring to FIG. 10, the single twist yarn 2120 forming the wrapping portion may be wound, as one wound object, around the outer surface 1231 of the attachment foot and the outer peripheral surface 1111 of the rod body in a first advance direction AD1 from the base end 1233 of the attachment foot toward the tip end 1234. Alternatively, the single twist yarn 2120 may be wound, as one wound object, around the outer surface 1231 of the attachment foot and the outer peripheral surface 1111 of the rod body in a second advance direction AD2 from the tip end 1234 of the attachment foot toward the base end 1233. That is, the direction, in which the single twist yarn advances while being wound, may be any one of the first advance direction AD1 and the second advance direction AD2. Therefore, according to the component fixing tool of one embodiment, a starting point where winding of the single twist yarn starts is not limited to only the tip end of the attachment foot. Alternatively, after the single twist yarn 2120 is wound in any one of the first and second advance directions AD1 and AD2, the single twist yarn 2120 may be wound in the other of the first and second advance directions AD1 and AD2. Therefore, the wrapping portion 2100 may be composed of one wound object that has at least two layers.

The component fixing tool according to one embodiment may include a coating portion which improves the external appearance of the wrapping portion and can firmly secure the single twist yarn of the wrapping portion into the state of being wound. Referring to FIGS. 13 and 14, the component fixing tool 2000 includes a coating portion 2200 that covers the wrapping portion 2100 entirely. The coating portion 2200 is coated on the wrapping portion 2100 so as to cover the wrapping portion 2100 and is composed of a coating material. The aforementioned coating material may be a synthetic resin material or an adhesive agent. The aforementioned coating material may be one of epoxy resin, urethane resin and ultraviolet curing resin, but is not limited thereto. By way of example, the liquefied coating material is applied to the entirety of the wrapping portion 2100, and the applied coating material is cured. In the state where the wrapping portion 2100 is formed by the single twist yarn, the liquefied coating material is applied on the outer surface of the single twist yarn of the wrapping portion 2100. The applied coating material is cured, thus forming the coating portion 2200 which covers and coats the wrapping portion 2100, a portion of the rod body 1110 adjacent to the wrapping portion 2100, and a portion of the fishing line guide adjacent to the wrapping portion 2100. The cured coating material is impregnated into the single twist yarn. The coating portion 2200 can scatter light. Therefore, when an angler observes the coating portion 2200, boundaries between the wound portions of the single twist yarn in the wrapping portion are not observed and the wrapping portion 2100 can be observed in a uniform color. The coating portion 2200 is coated on the wrapping portion 2100 so as to cover the above-described flat outer surface portion 2112 of the wrapping portion by entirely coating the flat outer surface portion 2112 with a synthetic resin material. Since the flat outer surface portion 2112 is approximately flat, the coating portion 2200 can have a good external appearance without unevenness.

As described above, the wrapping portion of the component fixing tool according to one embodiment is composed of the single twist yarn that is wound with the crushed and flattened cross-sectional shape in the state of being stretched by a tension force. The single twist yarn in the wrapping portion is wound in the irregularly wound form so that the overlapped or crossed form of the single twist yarn is formed within the wrapping portion and the wrapping portion has the flat outer surface portion without any gap. Thus, the wrapping portion not only has a flat external appearance, but also is capable of fixing the attachment foot with more enhanced fixing force. Accordingly, the component fixing tool according to one embodiment, which uses the single twist yarn to be stretched by a tension force, does not require a worker to have a high degree of proficiency needed for winding a folded yarn of the prior art technique in a regularly wound form.

Figure 15:
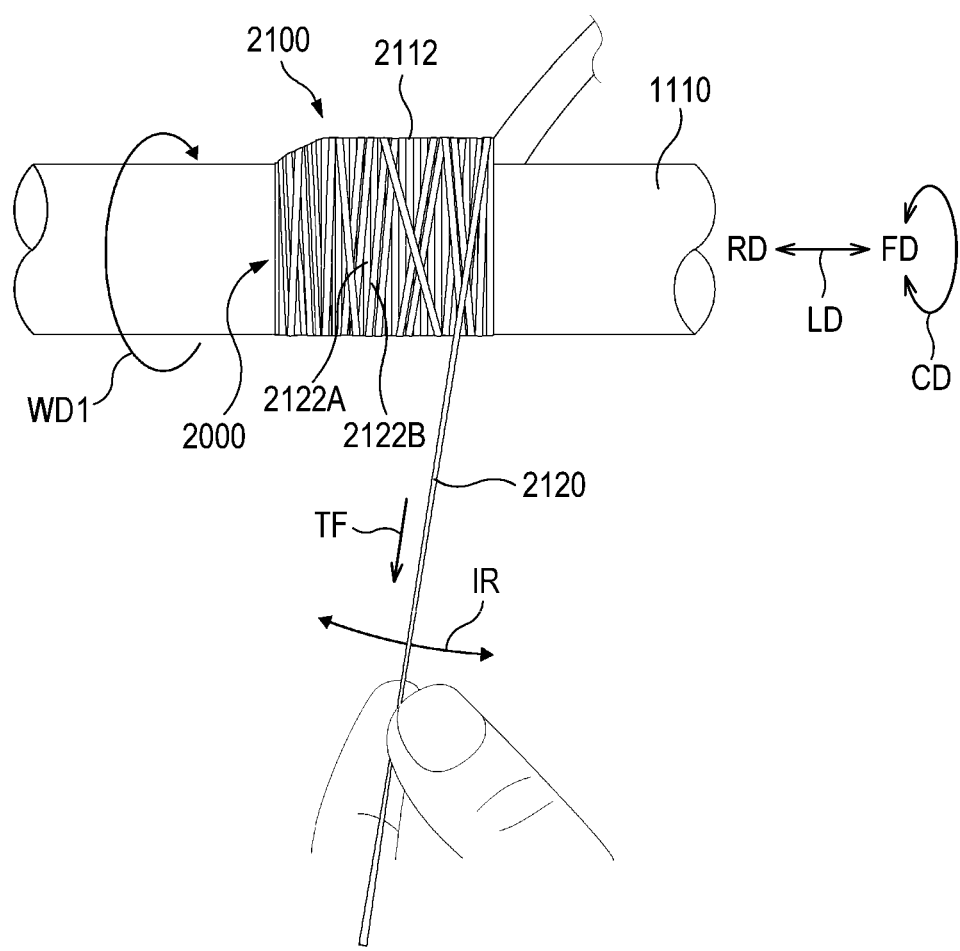
FIG. 15 shows an example where a wrapping portion of the component fixing tool according to one embodiment is formed by a single twist yarn.

FIG. 15 shows an example where the wrapping portion of the component fixing tool according to one embodiment is formed by the single twist yarn. Referring to FIG. 15, the single twist yarn 2120 stretched by a tension force TF is wound around the outer surface of the attachment foot and the outer peripheral surface of the rod body in the state where the attachment foot is placed on the outer peripheral surface of the rod body 1110. Stretching the single twist yarn 2120 by the tension force TF may be performed manually or by means of a mechanism configured to release the single twist yarn. By way of example, in the state where the attachment foot is placed on the outer peripheral surface of the rod body 1110, the rod body 1110 may be rotated in a direction of an arrow WD1. Therefore, the single twist yarn 2120 is wound around the outer surface of the attachment foot and the outer peripheral surface of the rod body 1110. Alternatively, the rod body 1110 is fixed, and the single twist yarn 2120 may be wound while being turned in the circumferential direction CD of the rod body 1110. The single twist yarn 2120 stretched by the tension force is wound such that the respective one-turn wound portions are partially overlapped with each other. Therefore, the tension force of the wound single twist yarn forming the wrapping portion 2100 does not become loosened. Further, since the single twist yarn 2120 stretched by the tension force TF is wound with the crushed and flattened cross-sectional shape, the wrapping portion 2100 has the flat outer surface portion 2112. Further, as shown by an arrow IR, the single twist yarn 2120 can be wound around the outer surface of the attachment foot and the outer peripheral surface of the rod body in the irregularly wound form. That is, the one-turn wound portion 2122A and the another one-turn wound portion 2122B can be wound in the irregularly wound form having overlapping and crossing, and not in the regularly wound form having parallel arrangement. Further, as described above, the single twist yarn 2120 may be wound in the aforementioned first advance direction, in the aforementioned second advance direction, or in the aforementioned second advance direction after the aforementioned first advance direction.

Figure 16:
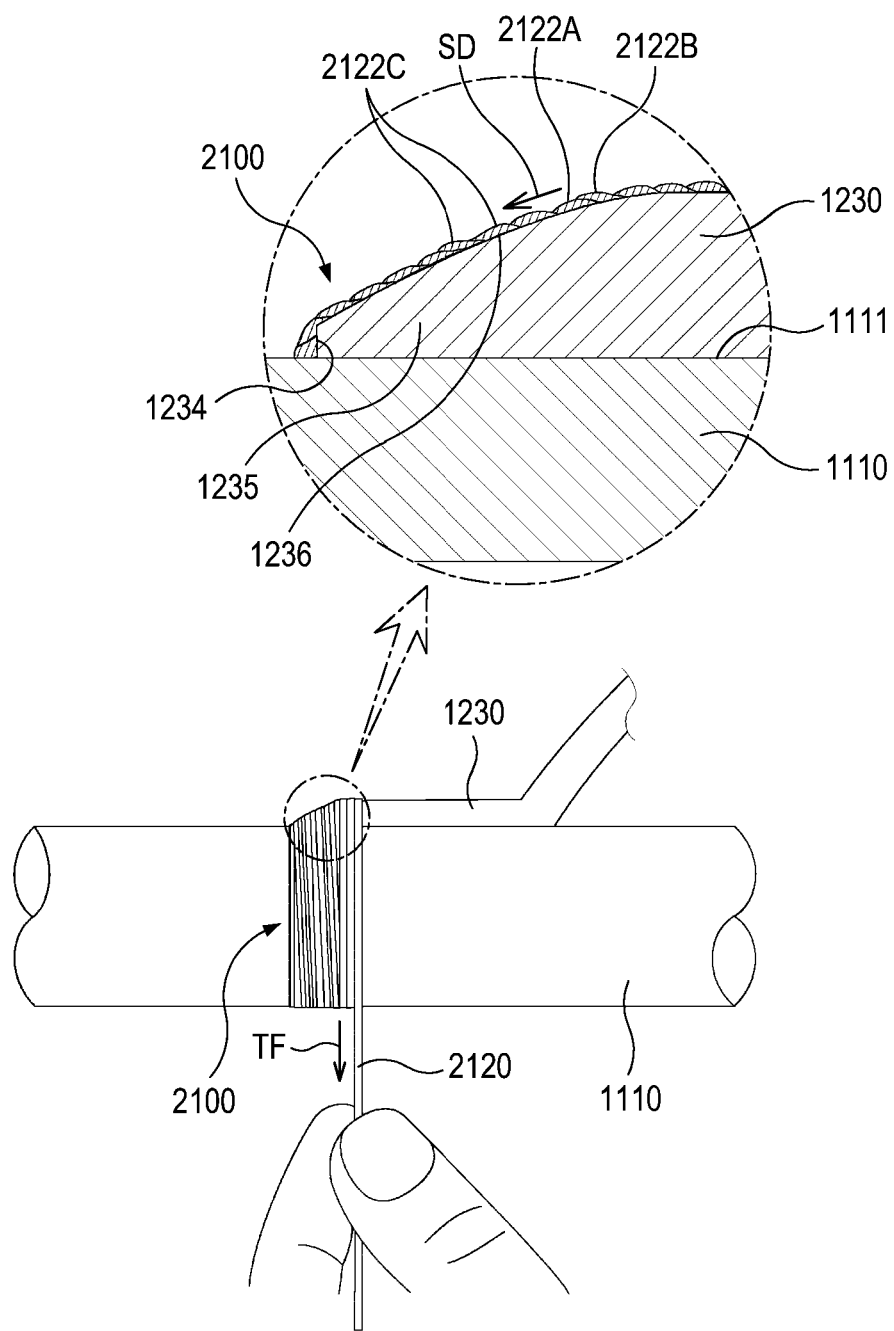
FIG. 16 shows an example where a wrapping portion of the component fixing tool according to one embodiment is formed in the vicinity of a tip end of an attachment foot.

FIG. 16 shows an example where the wrapping portion of the component fixing tool according to one embodiment is formed in the vicinity of the tip end of the attachment foot. Referring to FIG. 16, the attachment foot 1230 may have a tip end portion 1235 defining the sharpened tip end 1234. The tip end portion 1235 is inclined so as to descend toward the outer peripheral surface 1111 of the rod body 1110. Therefore, the attachment foot 1230 may have an inclined surface 1236 in the tip end portion 1235. The tip end portion 1235 may be formed by cutting a tip end portion of an attachment foot having a shape of a flat plate. Since the single twist yarn 2120 is stretched by the tension force TF, the cross-sectional shape of the single twist yarn wound around the attachment foot 1230 and the rod body 1110 has the crushed and flattened shape. Therefore, when the single twist yarn 2120 is wound on the inclined surface 1236 of the attachment foot 1230, the single twist yarn 2120 does not slip and fall from the inclined surface 1236. Further, the single twist yarn 2120 can be wound on the inclined surface 1236 of the attachment foot 1230 without any gap. As shown in an enlarged view of FIG. 16, since the wound single twist yarn 2120 has the crushed and flattened cross-sectional shape, the single twist yarn 2120 can be partially overlapped and become difficult to roll on the inclined surface 1236. Therefore, the single twist yarn 2120 does not slip in a direction of an arrow SD on the inclined surface 1236 of the tip end portion 1235 of the attachment foot. Accordingly, the single twist yarn 2120 may be wound in an ascending direction of the inclined surface 1236 of the attachment foot, and may be wound in a descending direction of the inclined surface 1236.

Figure 17:
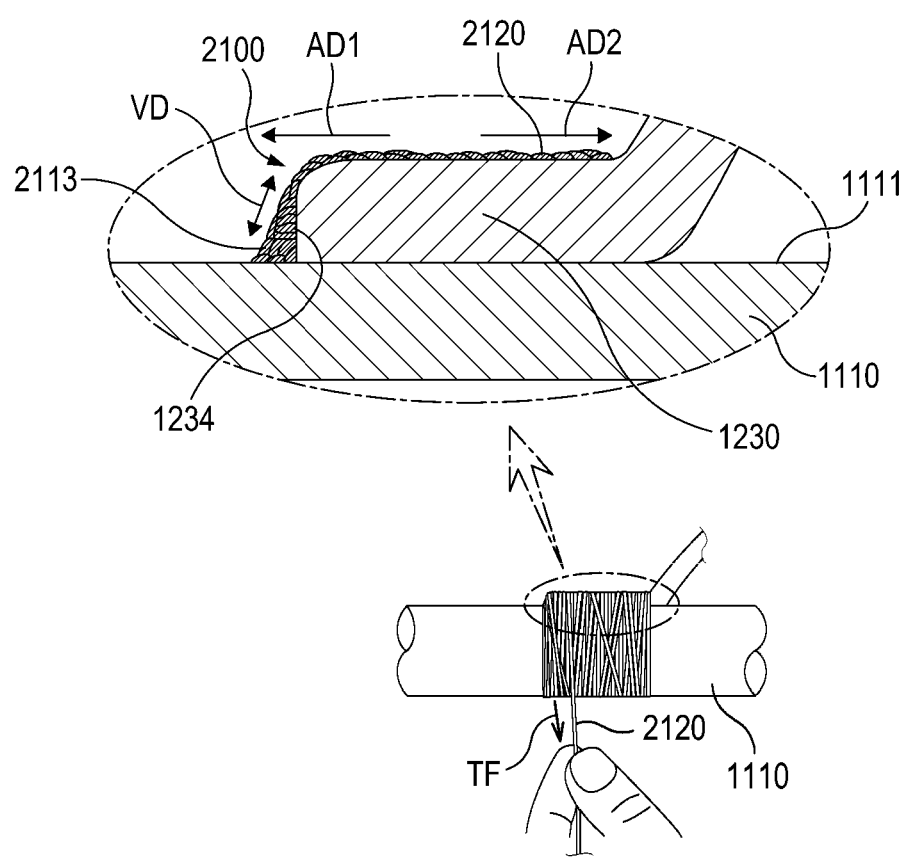
FIG. 17 shows an example where a wrapping portion of the component fixing tool according to one embodiment is applied to an attachment foot having a vertical tip end.

FIG. 17 shows an example where the wrapping portion of the component fixing tool according to one embodiment is applied to the attachment foot having a vertical tip end. The component fixing tool according to one embodiment uses the single twist yarn to be stretched by a tension force, and the single twist yarn is wound in the irregularly wound form having partial overlapping. According to the component fixing tool of the prior art shown in FIG. 5, the attachment foot must have a sharpened tip end and an inclined surface located adjacent to such a tip end in order to avoid the irregularly wound form of the folded yarn, and the folded yarn must be wound in an ascending direction of the inclined surface of the attachment foot. However, the component fixing tool according to one embodiment uses the single twist yarn that is stretched by a tension force so as to have the crushed and flattened cross-sectional shape. Accordingly, as shown in FIG. 17, the attachment foot 1230 can be configured without the aforementioned sharpened tip end and the aforementioned inclined surface located adjacent to the tip end. That is, the attachment foot 1230 may have a vertical surface, which is formed in the tip end 1234 and is approximately vertical to the outer peripheral surface 1111 of the rod body 1110, and the aforementioned vertical surface of the tip end may have a height corresponding to the thickness of the attachment foot 1230. The attachment foot 1230 having the aforementioned vertical surface can make a step between the tip end 1234 of the attachment foot and the outer peripheral surface 1111 of the rod body. As shown by an arrow VD, the stretched single twist yarn 2120 may be wound into a plurality of layers without any gap while being stacked between the aforementioned vertical surface of the tip end 1234 and the outer peripheral surface 1111 of the rod body. Therefore, the wrapping portion 2100 may have a tip end portion 2113 between the aforementioned vertical surface of the tip end 1234 of the attachment foot and the outer peripheral surface 1111 of the rod body and, in the tip end portion 2113, the single twist yarn is wound into a plurality of layers and is stacked. Further, the advance direction of the single twist yarn 2120 to be wound is not limited. That is, the single twist yarn 2120 may be wound in any one of the first advance direction AD1 and the second advance direction AD2.

As shown in FIG. 17, the component fixing tool of one embodiment can be effectively applied to the attachment foot having the vertical surface in the tip end 1234. Since the attachment foot has the vertical surface in the tip end 1234, the attachment foot can be configured to have a shorter length, and the operation of cutting the attachment foot for forming the aforementioned sharpened tip end and the aforementioned inclined surface in the attachment foot can be excluded. In addition, it is possible to eliminate a disadvantage of rust occurrence in the attachment foot which is caused by the operation of cutting the attachment foot.

Figure 18:
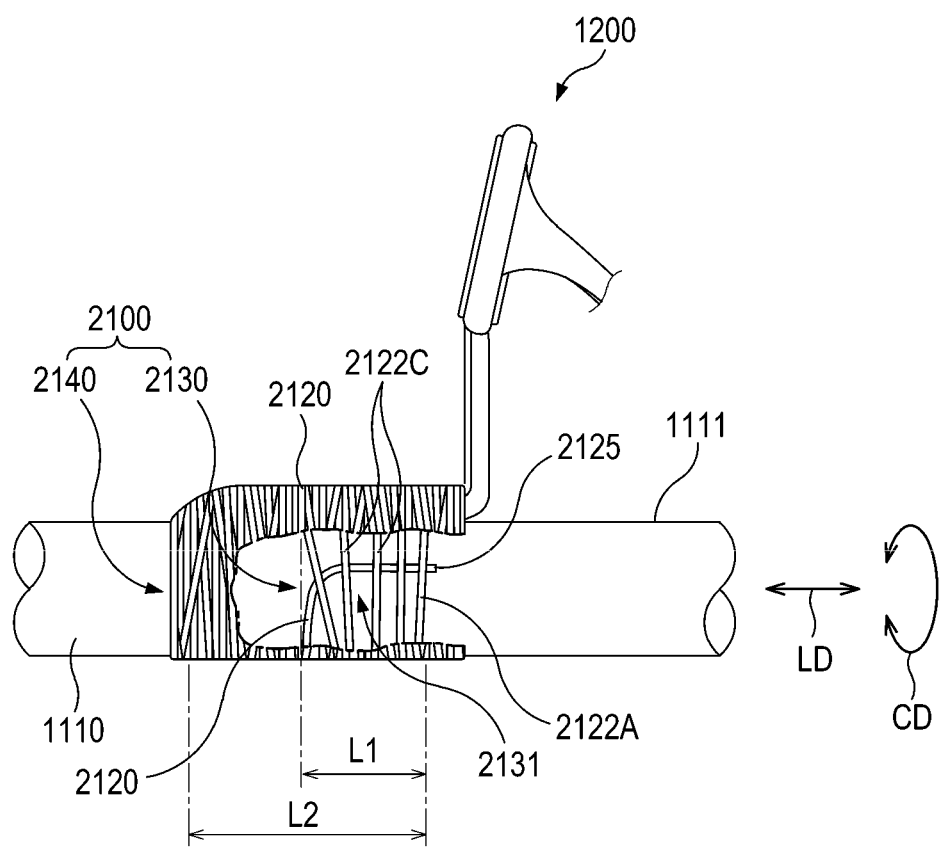
FIG. 18 is a side view showing a component fixing tool according to another embodiment.
Figure 19:
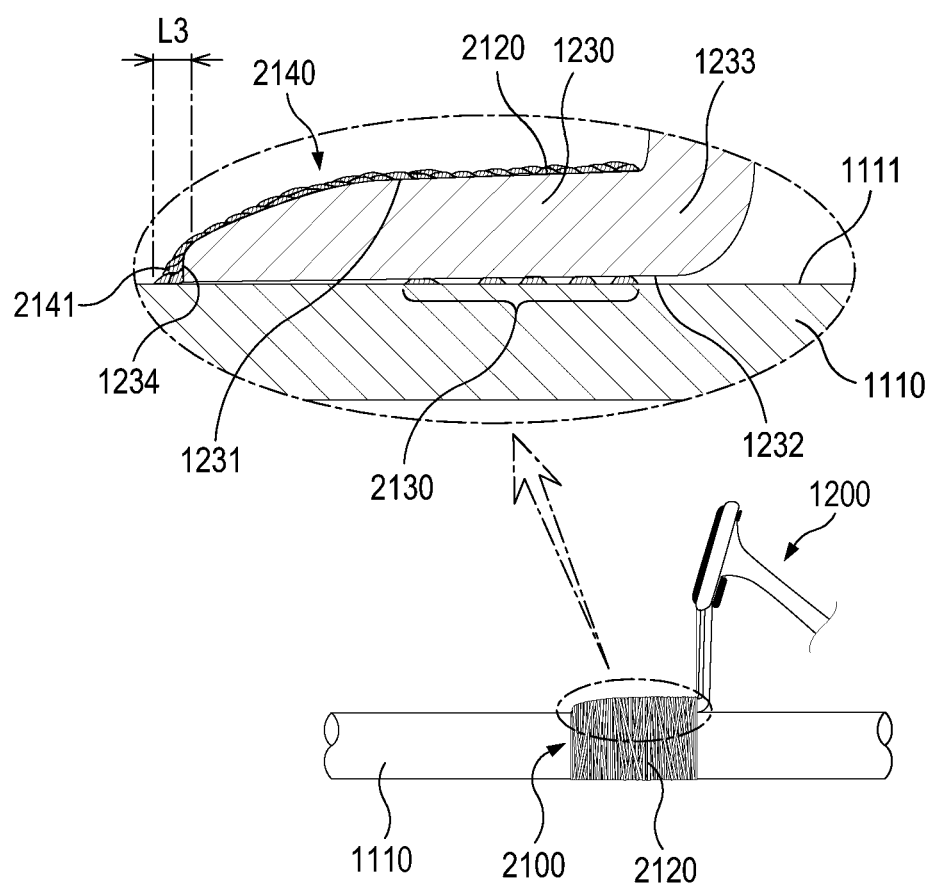
FIG. 19 shows the component fixing tool shown in FIG. 18 and the cross-sectional shape thereof.

By the single twist yarn stretched by a tension force, the wrapping portion of the component fixing tool according to one embodiment may be formed as one wound object wrapping the attachment foot and the rod body. In another embodiment, the wrapping portion may be composed of one wound object, which is disposed between the attachment foot and the rod body, and another wound object, which wraps the attachment foot and the rod body together. FIG. 18 is a side view showing a component fixing tool according to another embodiment, in which the component fixing tool is partially cut away, and FIG. 19 shows the component fixing tool shown in FIG. 18 and a cross-sectional shape thereof. The configuration of the wrapping portion, which is shown in FIGS. 18 and 19 and is composed of two wound objects of the single twist yarn, may be applied for fixing the fishing line guide shown in FIGS. 6 and 8.

Referring to FIGS. 18 and 19, the wrapping portion 2100 according to one embodiment includes two wound objects of the single twist yarn, which are formed by wounding the single twist yarn 2120 stretched by a tension force. The wrapping portion 2100 according to one embodiment includes an inner wrapping portion 2130 and an outer wrapping portion 2140. The inner wrapping portion 2130 and the outer wrapping portion 2140 are formed by a strand of the single twist yarn 2120 stretched by a tension force.

The inner wrapping portion 2130 is disposed between the inner surface 1232 of the attachment foot and the outer peripheral surface 1111 of the rod body, and forms a gap between the inner surface 1232 and the outer peripheral surface 1111 in a radially outward direction with respect to the center of the rod body. The inner wrapping portion 2130 is composed of the single twist yarn 2120, which is wound around the outer peripheral surface 1111 of the rod body in the circumferential direction CD by a plural number of winding turns in the state of being stretched by a tension force and is fixed to the outer peripheral surface 1111. The single twist yarn 2120 forming the inner wrapping portion 2130 is wound with a length shorter than the length of the attachment foot 1230. The inner wrapping portion 2130 is composed of the single twist yarn 2120, which is wound such that a length L1 of the inner wrapping portion 2130 in the longitudinal direction of the rod body is shorter than a length L2 of the attachment foot 1230 in the longitudinal direction of the rod body. Further, the inner wrapping portion 2130 is configured to fix a cut tip end portion 2125 of the single twist yarn 2120. The single twist yarn constituting the inner wrapping portion 2130 is connected to the outer wrapping portion 2140 in the state of being stretched by a tension force.

The single twist yarn 2120 stretched by a tension force is first wound around the outer peripheral surface of the rod body 1110. The cut tip end portion 2125 of the single twist yarn is fixed by a tension force between the one-turn wound portion 2122A of the single twist yarn and the outer peripheral surface 1111. Further, in the inner wrapping portion 2130, the single twist yarn 2120 is wound around the outer peripheral surface of the rod body 1110 by a plural number of winding turns of two turns to five turns, and is wound such that a gap 2131 is formed between the two adjacent one-turn wound portions 2122C. Since the gap 2131 is formed in the inner wrapping portion 2130, the above-described coating material of the coating portion can enter the gap 2131. The coating material entering the gap 2131 is interposed and cured between the inner surface 1232 of the attachment foot and the outer peripheral surface 1111 of the rod body, thereby stabilizing the fixed state of the fishing line guide.

The outer wrapping portion 2140 is composed of the single twist yarn 2120, which is connected from the inner wrapping portion 2130 and is stretched by a tension force. The outer wrapping portion 2140 is composed of the single twist yarn 2120, which is wound on all of the inner wrapping portion 2130, the outer surface 1231 of the attachment foot 1230, and the outer peripheral surface 1111 of the rod body by a multiple number of winding turns and is in the state of being stretched by a tension force. The outer wrapping portion 2140 is formed over the base end 1233 and the tip end 1234 of the attachment foot 1230, and is configured to wrap the attachment foot 1230 and the rod body 1110. The outer wrapping portion 2140 covers and hides the inner wrapping portion 2130. The attachment foot 1230 is firmly fixed to the rod body 1110 in a manner of being pressed toward the outer peripheral surface 1111 of the rod body by the outer wrapping portion 2140. The single twist yarn 2120 forming the outer wrapping portion 2140 may be fixed to the outer wrapping portion 2140 by means of a knot. For example, after the outer wrapping portion 2140 is formed, a portion of the single twist yarn, which is fixed to the outer wrapping portion 2140 by the knot, is cut from the outer wrapping portion. Thus, the cut terminal end portion of the single twist yarn can be fixed to the outer wrapping portion.

Figure 5:
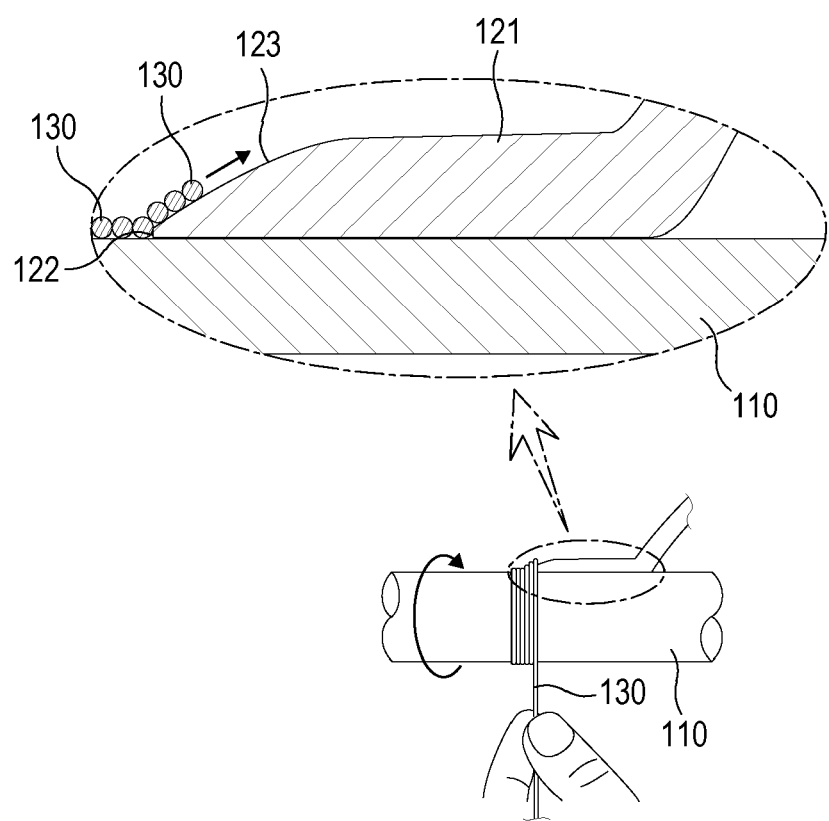
FIG. 5 shows an example of a prior art technique of winding a folded yarn in the vicinity of a tip end of an attachment foot in order to fix a fishing line guide to an outer peripheral surface of a rod body.

Referring to FIG. 19, in the wrapping portion 2100 composed of the single twist yarn 2120 stretched by a tension force, the outer wrapping portion 2140 may have a tip end portion 2141 between the tip end 1234 of the attachment foot and the outer peripheral surface 1111 of the rod body. By way of example, the tip end portion 2141 may be formed by the single twist yarn 2120 such that the tip end portion 2141 has a length L3 of more than 0 mm and less than or equal to 2 mm in a direction of being spaced away from the tip end 1234 of the attachment foot along the outer peripheral surface 1111 of the rod body 1110. As described above, the cut tip end portion 2125 of the single twist yarn is fixed to the inner wrapping portion 2130. Consequently, according to one embodiment, the single twist yarn 2120 is not required to be wound around the outer peripheral surface of the rod body 1110 from the tip end 1234 of the attachment foot by a predetermined length. That is, the single twist yarn is not required to be wound directly around the outer peripheral surface of the rod body from the tip end of the attachment foot along the outer peripheral surface of the rod body as shown in FIG. 5. Therefore, the wrapping portion of one embodiment can have a shorter length. Accordingly, the application amount of the coating material for forming the coating portion can be reduced, and productivity can be enhanced. Further, the fishing rod can be reduced in weight and the flexibility of the fishing rod can be enhanced.

The fishing rod component having the attachment foot can be firmly fixed to the rod body of the fishing rod by the component fixing tool according to the embodiments of the present disclosure. According to the present disclosure, the wrapping portion configured to wrap the attachment foot and the rod body is capable of firmly fixing the attachment foot to the outer peripheral surface of the rod body. The wrapping portion is formed as a wound object of the single twist yarn stretched by a tension force. After the wrapping portion is formed by the single twist yarn in the state of being stretched, the single twist yarn is cut. The cut terminal end portion of the single twist yarn is fixed to the wrapping portion, thus completing the wrapping portion that wraps the attachment foot and the rod body.

Accordingly, in the present disclosure, the component fixing method, which fixes the fishing rod component having the attachment foot to the rod body, includes forming the wrapping portion configured to wrap the attachment foot and the rod bod by winding the single twist yarn in the state of being stretched around the outer surface of the attachment foot and the outer peripheral surface of the rod body, and completing the wrapping portion by fixing the single twist yarn to the wrapping portion. Reference is made to FIGS. 20A to 21E regarding the component fixing method according to the present disclosure. FIGS. 20A to 21E show concrete examples of the processes to be performed for fixing the component. FIGS. 20A to 20E show an example where the wrapping portion is formed as one wound object of the single twist yarn. FIGS. 21A to 21E show an example where the wrapping portion is formed as two wound objects of the single twist yarn.

Figure 20A:
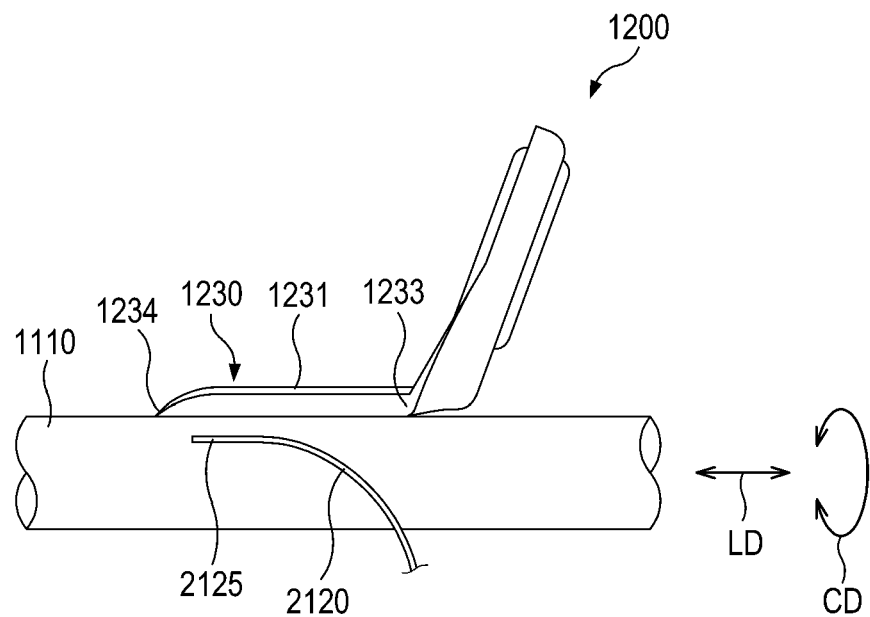
FIG. 20A is a side view showing one example of the process of fixing a fishing line guide to a rod body by a component fixing method according to one embodiment.
Figure 20B:
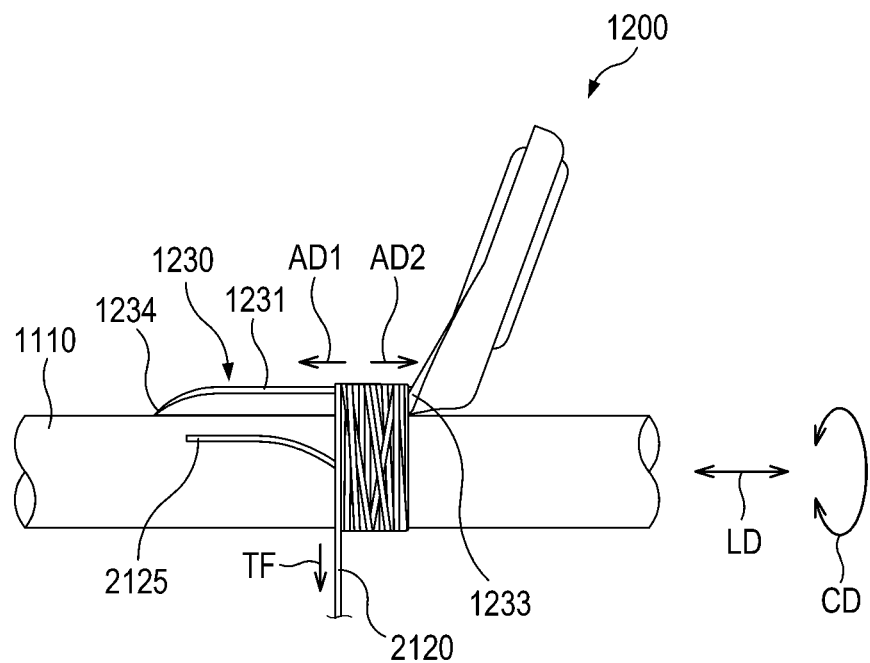
FIG. 20B is a side view showing a process subsequent to the process shown in FIG. 20A.
Figure 20C:
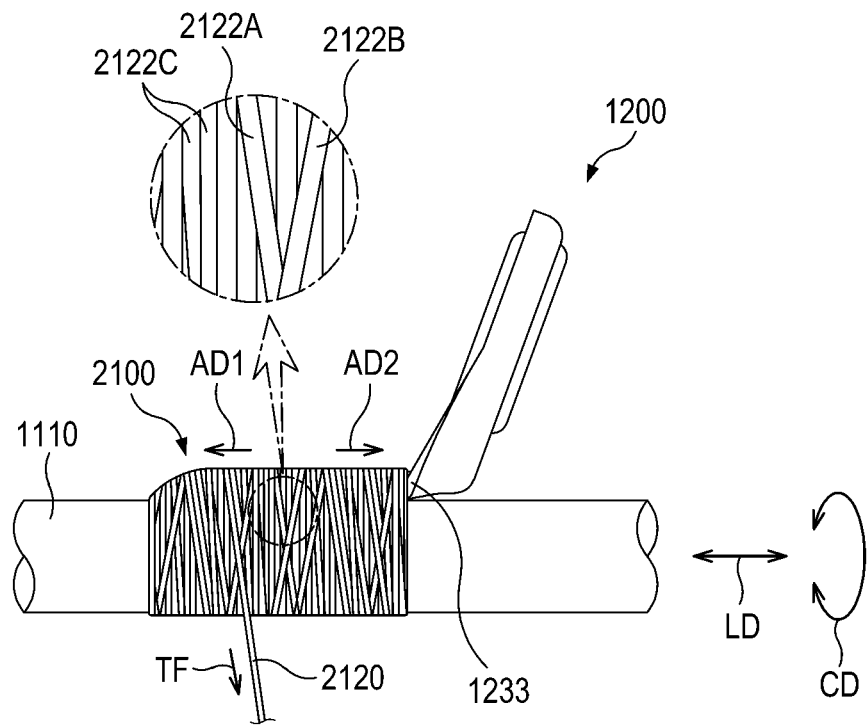
FIG. 20C is a side view showing a process subsequent to the process shown in FIG. 20B.

Referring to FIGS. 20A to 20C, the wrapping portion that wraps the attachment foot 1230 and the rod body 1110 may be formed by winding the single twist yarn 2120 around the outer surface 1231 of the attachment foot 1230, and the outer peripheral surface of the rod body 1110 while stretching the single twist yarn 2120 by a tension force. Since the single twist yarn 2120 stretched by a tension force has the crushed and flattened cross-sectional shape, the task of winding the single twist yarn is easy.

Figure 1:
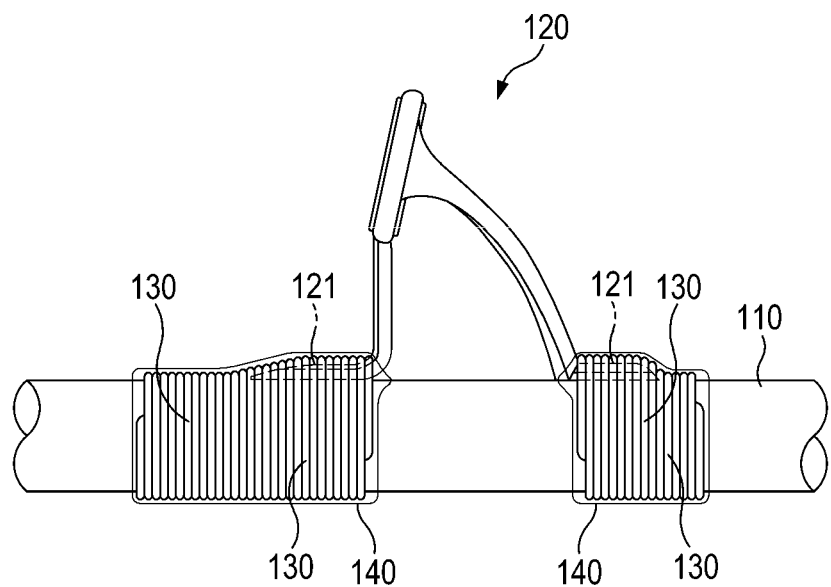
FIG. 1 is a side view showing a fishing line guide fixed to a rod body of a fishing rod according to a prior art technique.
Figure 2:
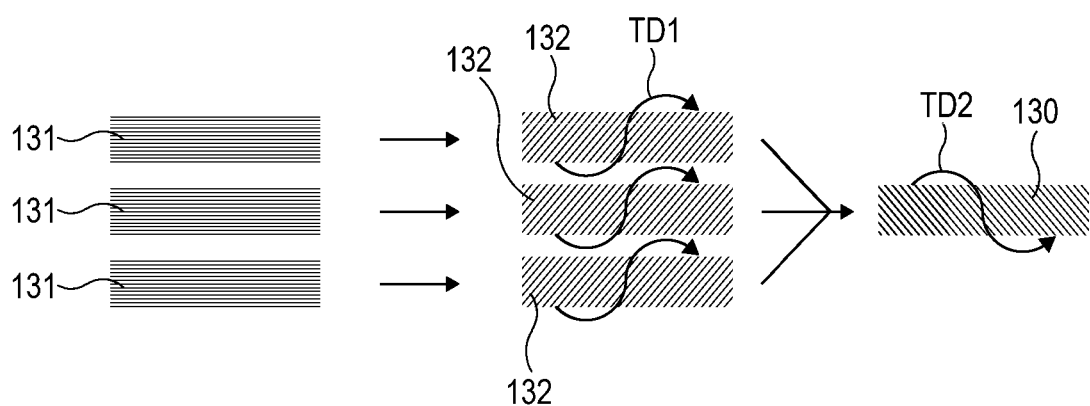
FIG. 2 schematically shows a structure of a folded yarn of a prior art technique, which is used for fixing a fishing line guide to a rod body of a fishing rod.
Figure 3:
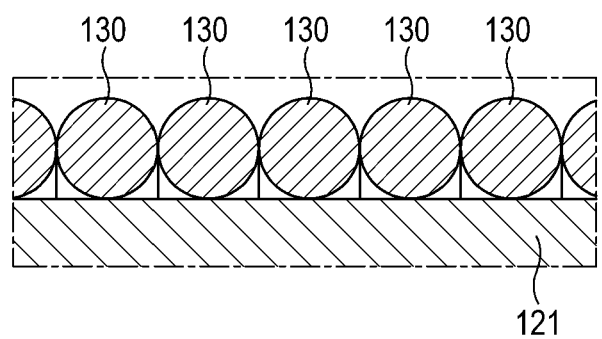
FIG. 3 is a cross-sectional view showing a state where the folded yarn of the prior art technique shown in FIG. 2 is wound on an attachment foot.
Figure 4A:
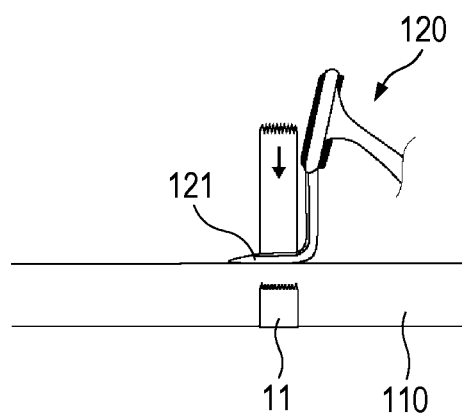
FIG. 4A is a side view showing one example of the process of a prior art technique for fixing a fishing line guide to a rod body by a folded yarn.
Figure 4B:
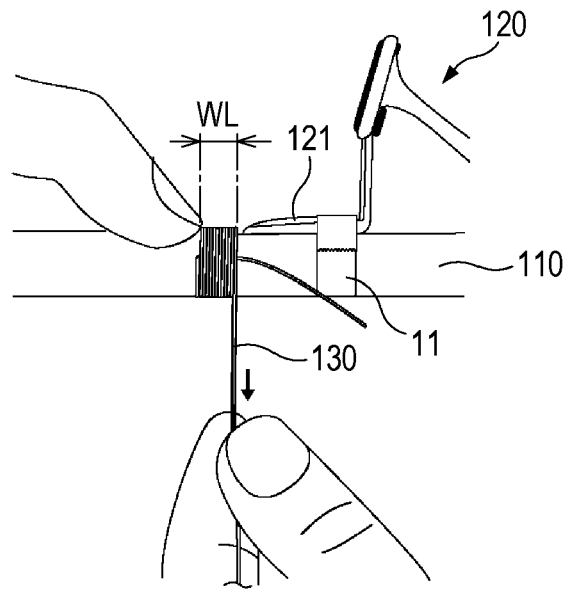
FIG. 4B is a side view showing a process subsequent to the process shown in FIG. 4A.
Figure 4C:
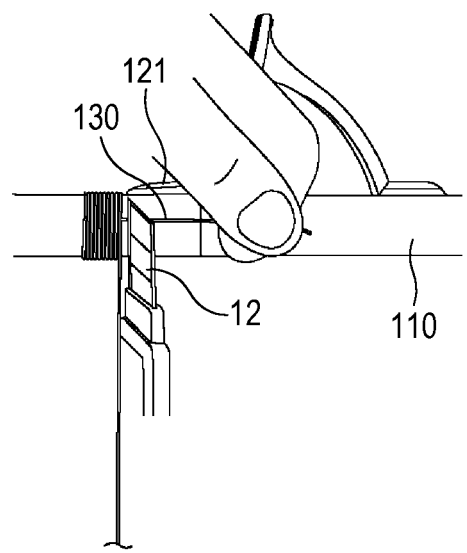
FIG. 4C is a side view showing a process subsequent to the process shown in FIG. 4B.
Figure 4D:
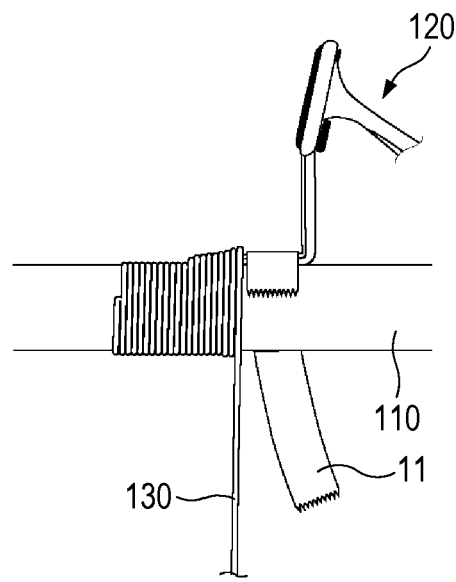
FIG. 4D is a side view showing a process subsequent to the process shown in FIG. 4C.
Figure 4E:
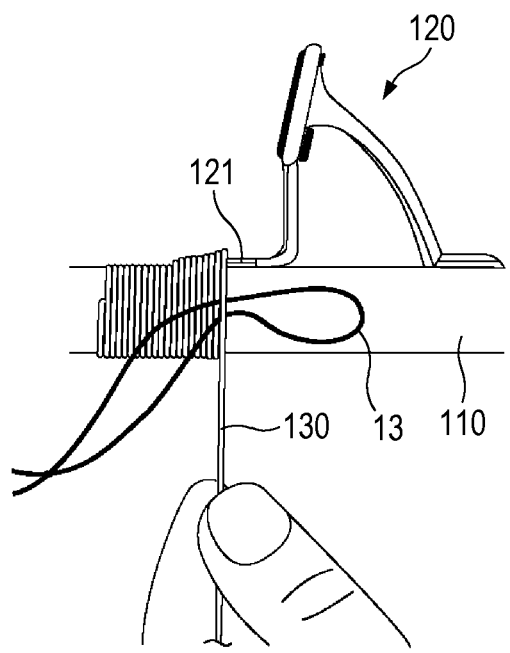
FIG. 4E is a side view showing a process subsequent to the process shown in FIG. 4D.
Figure 4F:
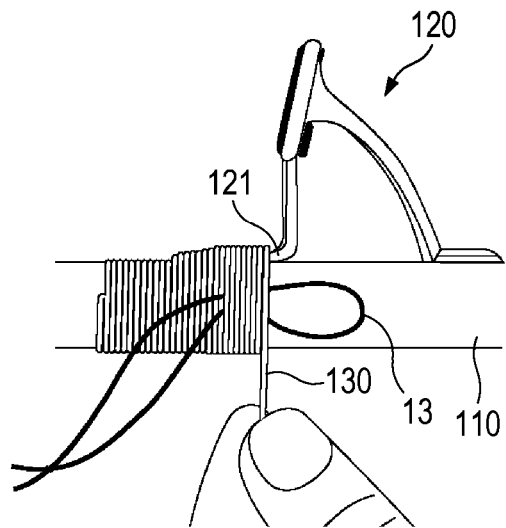
FIG. 4F is a side view showing a process subsequent to the process shown in FIG. 4E.
Figure 4G:
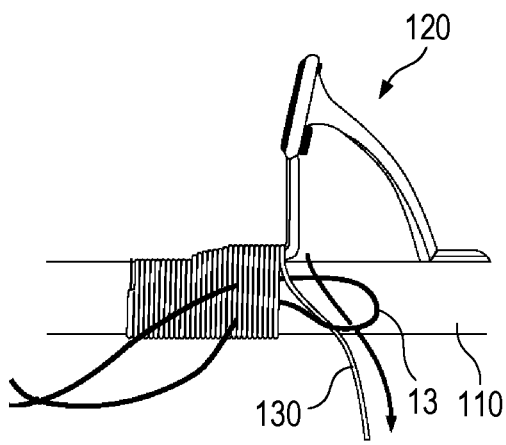
FIG. 4G is a side view showing a process subsequent to the process shown in FIG. 4F.
Figure 4H:
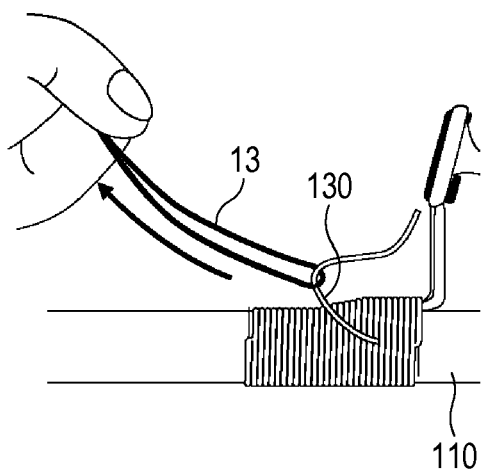
FIG. 4H is a side view showing a process subsequent to the process shown in FIG. 4G.
Figure 4I:
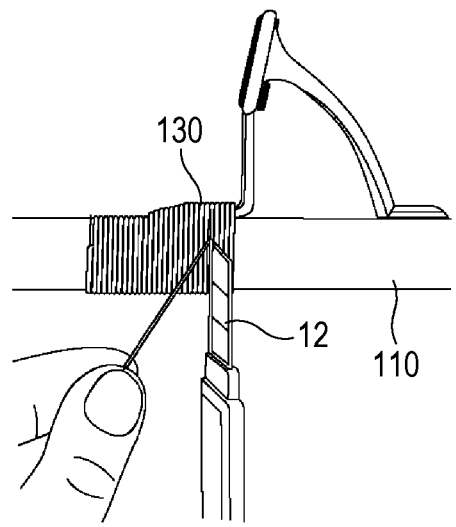
FIG. 4I is a side view showing a process subsequent to the process shown in FIG. 4H.

As shown in FIG. 20A, the fishing line guide 1200 (one example of the fishing rod component) is placed on the outer peripheral surface of the rod body 1110, and an initial portion of the single twist yarn 2120 (the cut tip end portion 2125 of the single twist yarn) is brought into contact with the outer peripheral surface of the rod body 1110 to be adjacent to the attachment foot 1230. As shown in FIGS. 20B and 20C, in the state where the attachment foot 1230 is placed on the outer peripheral surface of the rod body 1110, the single twist yarn 2120 is wound around the outer surface 1231 of the attachment foot 1230 and the outer peripheral surface of the rod body 1110 by a multiple number of winding turns. Since the single twist yarn 2120 is wound so as to cover the cut tip end portion 2125, the cut end portion of the single twist yarn can be simply handled. In addition, it is unnecessary to fix the attachment foot by using the tape shown in FIG. 4A.

The single twist yarn 2120 is wound around the outer surface of the attachment foot 1230 and the outer peripheral surface of the rod body 1110 while being stretched by the tension force TF such that the cross-sectional shape of the single twist yarn has a width larger than a thickness (see FIG. 12). As the rod body 1110 and the fishing line guide 1200 are rotated together, or as the rod body 1110 and the fishing line guide 1200 are fixed but the single twist yarn 2120 is turned about the rod body 1110, the single twist yarn 2120 may be wound.

As shown in FIG. 20C, forming the wrapping portion 2100 is performed such that the one-turn wound portion 2122A of the single twist yarn and the another one-turn wound portion 2122B of the single twist yarn form an angle with respect to each other. That is, the task of winding the single twist yarn 2120 for forming the wrapping portion 2100 is performed such that the single twist yarn is wound in the irregularly wound form having an overlapping and crossing form. Further, forming the wrapping portion 2100 is performed such that the above-described overlapping portion and the above-described flat outer surface portion are formed in the wrapping portion 2100 by the task of winding the single twist yarn 2120 (see FIG. 12). In the overlapping portion, the two adjacent one-turn wound portions 2122C of the single twist yarn stretched by the tension force TF are at least partially overlapped along the longitudinal direction LD of the rod body. The flat outer surface portion is defined by the outer surfaces of the respective one-turn wound portions of the single twist yarn stretched by the tension force TF. Specifically, the flat outer surface portion is partially defined by the outer surfaces of the two adjacent one-turn wound portions 2122C of the single twist yarn stretched by the tension force TF.

Further, as shown in FIG. 20C, forming the wrapping portion 2100 is performed such that the one-turn wound portion 2122A of the single twist yarn is in contact with the outer surface of the attachment foot and the outer peripheral surface of the rod body 1110 by surface contact through the aforementioned flat contact surface (see FIG. 12) in the state where the single twist yarn 2120 is stretched by the tension force.

As shown in FIGS. 20B and 20C, the task of winding the single twist yarn 2120 in the state of being stretched may start at the base end 1233 of the attachment foot 1230. The single twist yarn 2120 is wound while advancing in the first advance direction AD1, and thereafter, the single twist yarn may be wound while advancing in the second advance direction AD2.

Alternatively, the task of winding the single twist yarn 2120 may start at the tip end 1234 of the attachment foot 1230. In addition, the task of winding the single twist yarn 2120 may be finished after the single twist yarn is wound only in any one of the first advance direction AD1 and the second advance direction AD2. Therefore, forming the wrapping portion 2100 may be performed such that the single twist yarn 2120 in the stretched state is wound in any one of the first advance direction AD1 and the second advance direction AD2.

Further, forming the wrapping portion 2100 may be performed so as to form the tip end portion 2113 shown in FIG. 17. That is, where the vertical surface shown in FIG. 17 is provided in the tip end 1234 of the attachment foot 1230, the single twist yarn 2120 is wound into a plurality of layers and stacked, thus forming the aforementioned tip end portion 2113.

Figure 20D:
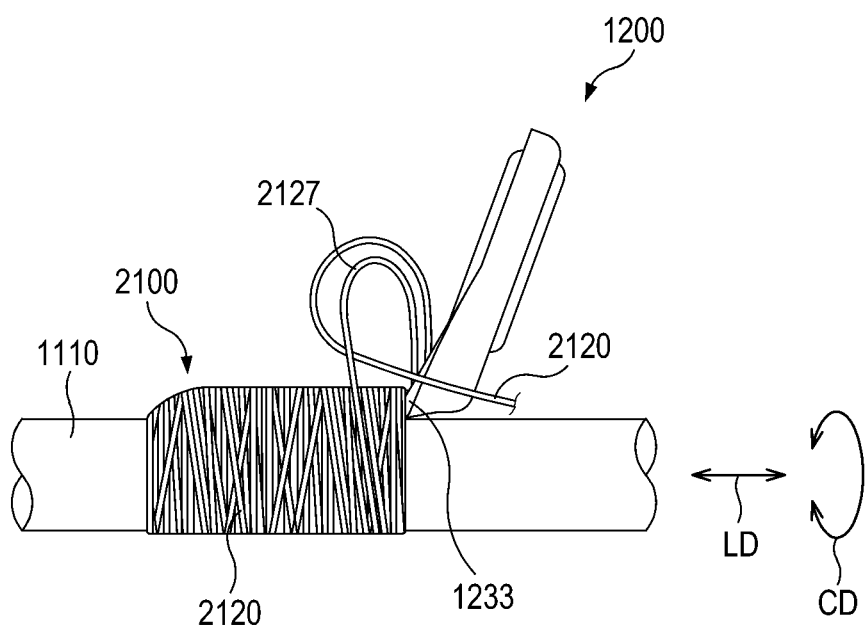
FIG. 20D is a side view showing a process subsequent to the process shown in FIG. 20C.

Referring to FIG. 20D, after the wrapping portion 2100 is formed by the single twist yarn 2120 stretched by the tension force, the single twist yarn 2120 is fixed to the wrapping portion 2100. The task of fixing the single twist yarn 2120 to the wrapping portion 2100 may be performed by making a knot of the single twist yarn in the wrapping portion 2100. That is, completing the wrapping portion 2100 includes fixing the single twist yarn to the wrapping portion 2100 by a knot.

When winding the single twist yarn 2120 around the attachment foot and the rod body, the respective one-turn wound portions of the single twist yarn are partially overlapped. Although the tension force applied to the wrapping portion 2100 is loosened, the single twist yarn 2120 is not unwound. Therefore, the wrapping portion 2100 can be completed by fixing the single twist yarn 2120 to the wrapping portion 2100 by a knot in the state where the tension force is loosened. A portion of the single twist yarn protruding from the knot is cut, and therefore the cut terminal end portion of the single twist yarn can be fixed to the wrapping portion 2100. For example, as shown in FIG. 20D, after the wrapping portion 2100 is formed by winding the single twist yarn 2120, the tension force applied to the single twist yarn 2120 is loosened, and a single twist yarn loop 2127, which can be wound on the wrapping portion 2100, the base end 1233 of the attachment foot, or the wrapping portion 2100 and the base end 1233 of the attachment foot, is made. Thereafter, the single twist yarn is passed through the single twist yarn loop 2127. Thereafter, the single twist yarn that has passed through the single twist yarn loop 2127 is pulled, and the single twist yarn loop 2127 is closed thereby. Therefore, the single twist yarn is fixed to the wrapping portion 2100 by the knot, and the knot formed in the wrapping portion 2100 is not distinctly observed. Thereafter, the single twist yarn protruding from the knot is cut. Therefore, as shown in FIG. 20E, the wrapping portion 2100 is completed and the cut terminal end portion (not shown) of the single twist yarn is fixed to the wrapping portion 2100.

Figure 20E:
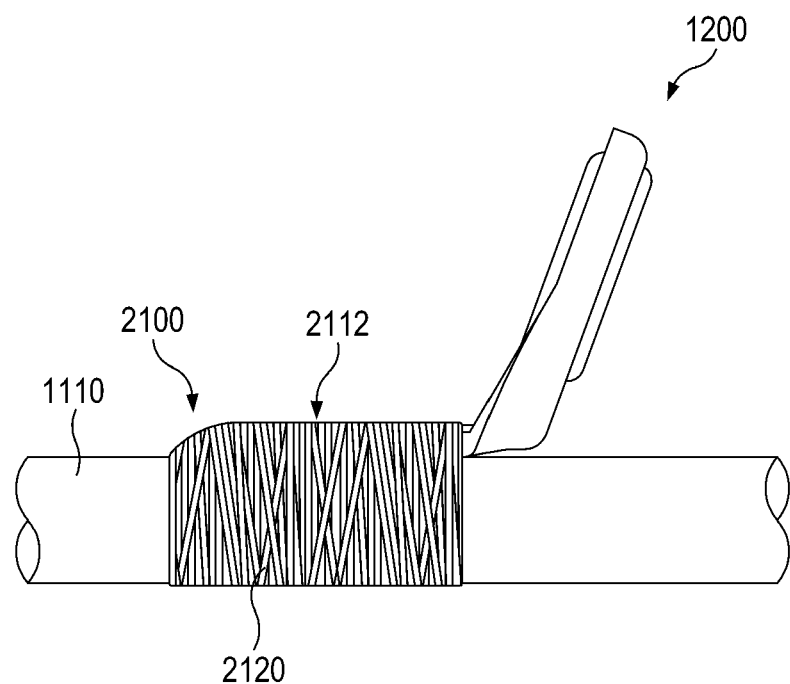
FIG. 20E is a side view showing a process subsequent to the process shown in FIG. 20D.

After the wrapping portion 2100 is completed as shown in FIG. 20E, the coating portion 2200 shown in FIGS. 13 and 14 may be formed so as to cover the flat outer surface portion 2112 of the wrapping portion by coating the flat outer surface portion 2112 of the wrapping portion over the entirety thereof with the synthetic resin material. That is, the component fixing method according to one embodiment may include forming the coating portion 2200 after completing the wrapping portion 2100.

The examples shown in FIGS. 20A to 20E illustrate fixing the component of the fishing rod to the rod body of the fishing rod with fewer processes. Accordingly, the component fixing method according to one embodiment can be performed with fewer processes than the number of processes of the prior art shown in FIGS. 4A to 4I.

Reference is made to FIGS. 21A to 21E as to the component fixing method using the above-described wrapping portion which is composed of two wound objects of the single twist yarn.

Referring to FIGS. 21A to 21D, forming the wrapping portion composed of two wound objects of the single twist yarn includes forming the inner wrapping portion 2130, temporarily fixing the attachment foot 1230 to the outer peripheral surface of the rod body 1110, and forming the outer wrapping portion 2140.

Figure 21A:
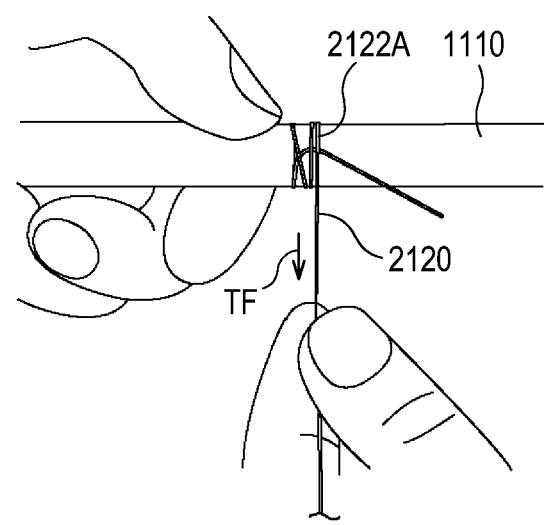
FIG. 21A is a side view showing another example of the process of fixing a fishing line guide to a rod body by a component fixing method according to one embodiment.

As shown in FIG. 21A, the single twist yarn 2120 is wound around the outer peripheral surface of the rod body 1110 by a plural number of winding turns. In the state where the single twist yarn 2120 is stretched by the tension force TF, the single twist yarn 2120 is wound around the outer peripheral surface of the rod body 1110. At this time, the single twist yarn 2120 is wound around the outer peripheral surface of the rod body 1110 such that a portion of the initial portion of the single twist yarn is covered by the one-turn wound portion 2122A of the single twist yarn. Therefore, the aforementioned portion of the initial portion of the single twist yarn is fixed.

Figure 21B:
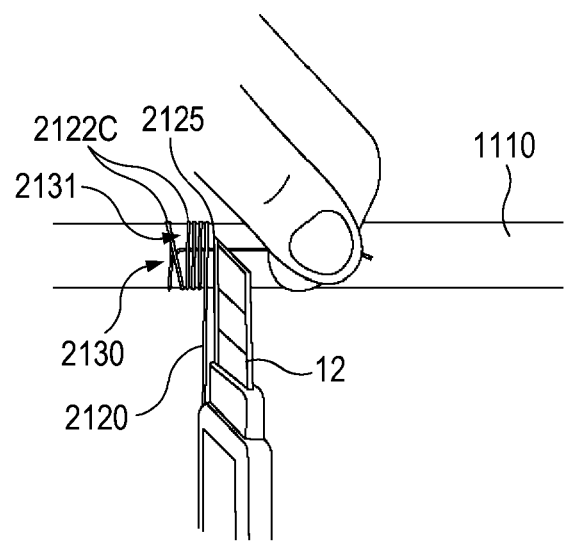
FIG. 21B is a side view showing a process subsequent to the process shown in FIG. 21A.

As shown in FIG. 21B, if the single twist yarn 2120 is wound around the outer peripheral surface of the rod body 1110 by a plural number of winding turns (e.g., two turns to five turns), the inner wrapping portion 2130, which forms a gap between the inner surface of the attachment foot and the outer peripheral surface of the rod body, is formed. When forming the inner wrapping portion 2130, the single twist yarn 2120 is wound so as to form the gap 2131 between the two adjacent one-turn wound portions 2122C. Further, the single twist yarn 2120 in the inner wrapping portion 2130 is wound by a length shorter than the length of the attachment foot. After the inner wrapping portion 2130 is formed, a portion of the single twist yarn protruding from the outermost one-turn wound portion of the single twist yarn is cut by the cutter 12. Therefore, the cut tip end portion 2125 of the single twist yarn is fixed to the inner wrapping portion 2130. As such, forming the inner wrapping portion 2130 is performed such that the cut tip end portion 2125 of the single twist yarn is fixed to the inner wrapping portion 2130, and such that the gap is formed between the two adjacent one-turn wound portions 2122C of the single twist yarn. Since the gap 2131 is formed in the inner wrapping portion 2130, the above-described coating material enters the gap 2131, and the coating material that has entered the gap 2131 can be interposed and cured between the inner surface of the attachment foot and the outer peripheral surface of the rod body. After the inner wrapping portion 2130 is formed, the single twist yarn 2120 continues to extend from the inner wrapping portion 2130.

Figure 21C:
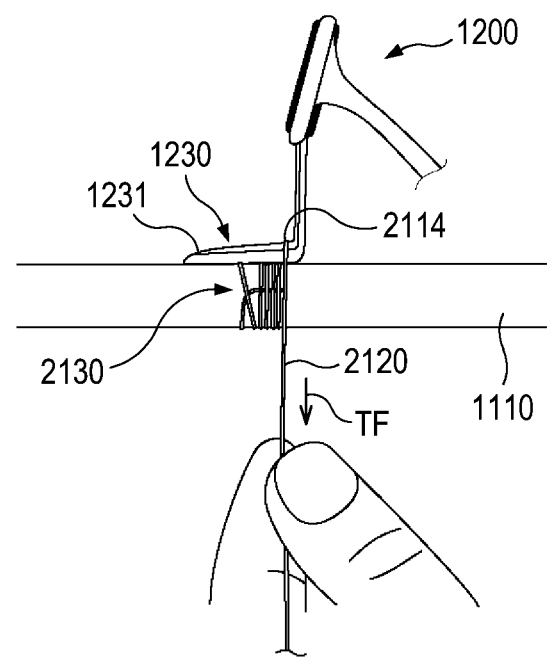
FIG. 21C is a side view showing a process subsequent to the process shown in FIG. 21B.

As shown in FIG. 21C, after the inner wrapping portion 2130 is formed, the attachment foot 1230 of the fishing line guide is placed on the outer peripheral surface of the rod body 1110 through the inner wrapping portion 2130. The outer surface of the single twist yarn in the inner wrapping portion 2130 is flat due to the tension force. Thus, when the attachment foot 1230 is placed on the outer peripheral surface of the rod body, rattling or tilting of the fishing line guide does not occur. After the attachment foot 1230 is placed on the outer peripheral surface of the rod body through the inner wrapping portion 2130, the single twist yarn 2120, which is connected from the inner wrapping portion 2130 and is stretched by the tension force TF, is wound on the outer surface 1231 of the attachment foot 1230. Therefore, the attachment foot 1230 of the fishing line guide is temporarily fixed to the outer peripheral surface of the rod body 1110. Accordingly, the wrapping portion according to one embodiment has a temporary fixing portion 2114. The temporary fixing portion 2114 is formed by a portion of the single twist yarn connected from the inner wrapping portion, and is configured to temporarily fix the attachment foot of the fishing line guide to the rod body. When the fishing line guide is temporarily fixed to the rod body, the single twist yarn connected from the inner wrapping portion 2130 may be wound on the base end of the attachment foot 1230 or on any location between the base end and the tip end of the attachment foot 1230.

Figure 21D:
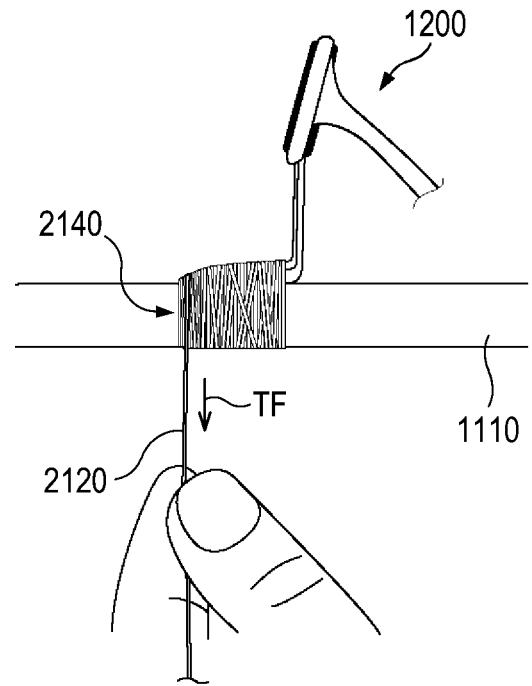
FIG. 21D is a side view showing a process subsequent to the process shown in FIG. 21C.

As shown in FIG. 21D, after the attachment foot is temporarily fixed to the outer peripheral surface of the rod body, the single twist yarn 2120, which is connected from the inner wrapping portion and temporarily fixes the attachment foot, is wound over the entire area of the attachment foot (from the base end of the attachment foot up to the tip end thereof). At this time, the single twist yarn 2120 is wound around the inner wrapping portion, the outer surface of the attachment foot, and the outer peripheral surface of the rod body 1110 by a multiple number of winding turns in the state of being stretched. Therefore, the outer wrapping portion 2140 covering the inner wrapping portion, the outer surface of the attachment foot, and the outer peripheral surface of the rod body is formed. Since the outer wrapping portion 2140 covers and hides the inner wrapping portion, the inner wrapping portion is not exposed. While the outer wrapping portion 2140 is being formed, the single twist yarn 2120 stretched by the tension force is wound in the above-described irregularly wound form. Therefore, the above-described overlapping portion and the above-described flat outer surface portion are formed in the outer wrapping portion 2140.

According to the component fixing method illustrated in FIGS. 21A to 21E, the cut tip end portion of the single twist yarn is fixed to the inner wrapping portion, and a strand of the single twist yarn first forms the inner wrapping portion in the state of being stretched by the tension force. Thereafter, the single twist yarn connected from the inner wrapping portion is wound on the attachment foot of the fishing line guide in the state of being stretched by the tension force, thus temporarily fixing the fishing line guide to the rod body. Thereafter, the single twist yarn temporarily fixing the fishing line guide is wound around the attachment foot and the rod body, thus forming the outer wrapping portion of the wrapping portion. As such, the wrapping portion including the inner wrapping portion and the outer wrapping portion is formed by using a strand of the single twist yarn. That is, in the component fixing method according to one embodiment, forming the inner wrapping portion, temporarily fixing the attachment foot, and forming the outer wrapping portion are performed by using a strand of the single twist yarn that is in the state of being stretched by the tension force. The inner wrapping portion is covered and hidden by the outer wrapping portion, and the attachment foot and the outer peripheral surface of the rod body are wrapped together by the single twist yarn of the outer wrapping portion.

According to one embodiment, the outer wrapping portion of the wrapping portion may be formed such that a length between the tip end of the outer wrapping portion and the tip end of the attachment foot is very short or almost non-existent. That is, forming the outer wrapping portion 2140 may be performed so as to form the tip end portion 2141 shown in FIG. 19 between the tip end of the attachment foot and the outer peripheral surface of the rod body. By way of example, in forming the outer wrapping portion 2140, the single twist yarn may be wound in the vicinity of the tip end of the attachment foot such that the tip end portion 2141 having a length of more than 0 mm and less than or equal to 2 mm in a direction of being spaced away from the tip end of the attachment foot along the outer peripheral surface of the rod body is formed in the outer wrapping portion by the single twist yarn. Since the cut tip end portion of the single twist yarn is fixed to the inner wrapping portion as described above, the single twist yarn 2120 is not required to be wound around the outer peripheral surface of the rod body 1110 from the tip end of the attachment foot by a predetermined length. Thus, the wrapping portion including the outer wrapping portion can have a shorter length.

Figure 21E:
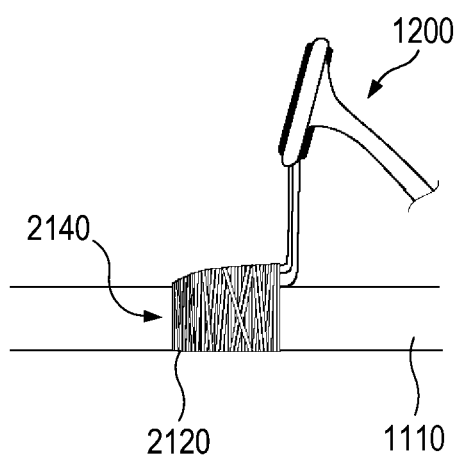
FIG. 21E is a side view showing a process subsequent to the process shown in FIG. 21D.

The wrapping portion including the inner and outer wrapping portions is completed by fixing the single twist yarn 2120 to the outer wrapping portion 2140 of the wrapping portion after the outer wrapping portion 2140 is formed as shown in FIG. 21E. Thus, in the component fixing method according to one embodiment, completing the wrapping portion includes fixing the single twist yarn 2120 of the outer wrapping portion 2140 to the outer wrapping portion 2140 and cutting the single twist yarn protruding from the outer wrapping portion 2140. Therefore, the cut terminal end portion of the single twist yarn can be fixed to the outer wrapping portion. After the outer wrapping portion is completed as described above, the coating portion 2200 shown in FIGS. 13 and 14 may be formed so as to cover the aforementioned flat outer surface portion by coating the flat outer surface portion of the wrapping portion 2100 (i.e., the flat outer surface portion formed in the outer wrapping portion) over the entirety of the flat outer surface portion with the synthetic resin material. That is, the component fixing method according to one embodiment may include forming the coating portion 2200 after completing the outer wrapping portion 2140.

Figure 22A:
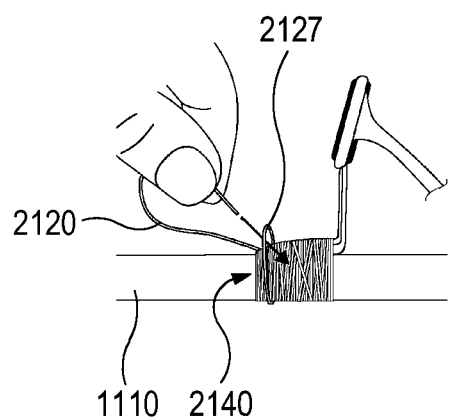
FIG. 22A is a side view showing one example of the process of completing an outer wrapping portion.
Figure 22B:
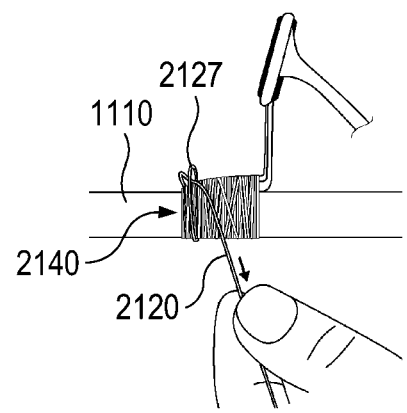
FIG. 22B is a side view showing a process subsequent to the process shown in FIG. 22A.
Figure 22C:
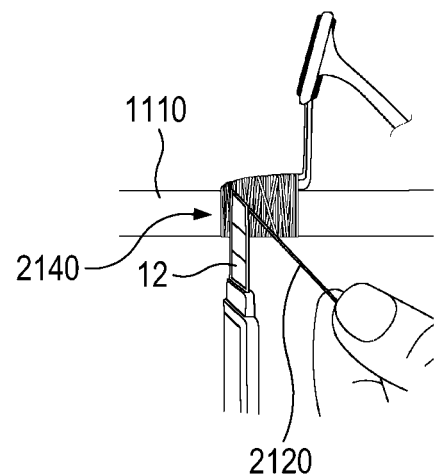
FIG. 22C is a side view showing a process subsequent to the process shown in FIG. 22B.

FIGS. 22A to 22C show one example of the process of completing the outer wrapping portion after forming the outer wrapping portion by the single twist yarn. When the single twist yarn stretched by the tension force is wound around the attachment foot and the rod body, the one-turn wound portion and the another one-turn wound portion of the single twist yarn are partially overlapped. Thus, even if the tension force applied to the single twist yarn is loosened, the wound single twist yarn is not unwound. Therefore, the single twist yarn can be fixed in the state of loosening the tension force applied to the single twist yarn. Referring to FIG. 22A, after the outer wrapping portion 2140 is formed by winding the single twist yarn 2120, the tension force applied to the single twist yarn 2120 is loosened, and the single twist yarn loop 2127 is made in the single twist yarn of the outer wrapping portion 2140. Thereafter, referring to FIG. 22B, the single twist yarn 2120 is passed through the single twist yarn loop 2127. Thereafter, the single twist yarn 2120 is pulled and the single twist yarn loop 2127 is closed. Therefore, the single twist yarn 2120 can be fixed to the outer wrapping portion 2140. Referring to FIG. 22C, a portion of the single twist yarn protruding from the outer wrapping portion 2140 is cut by the cutter 12, and therefore, the cut terminal end portion of the single twist yarn is positioned in and fixed to the outer wrapping portion 2140. The fixing manner of the single twist yarn shown in FIGS. 22A to 22C may be a knotting manner such as an overhand knot or a half hitch knot. As such, the cut terminal end portion of the single twist yarn is fixed to the outer wrapping portion 2140, thus completing the wrapping portion including the outer wrapping portion and the inner wrapping portion. The fixing manner shown in FIGS. 22A to 22C may be used for completing the wrapping portion that is composed of one wound object of the single twist yarn shown in FIG. 20D.

In another embodiment, completing the outer wrapping portion may be performed so as to fix the single twist yarn to the outer wrapping portion by using a yarn loop. In this regard, reference is made to FIGS. 23A to 23D showing another example of the process of completing the outer wrapping portion after the outer wrapping portion is formed by the single twist yarn.

Figure 23A:
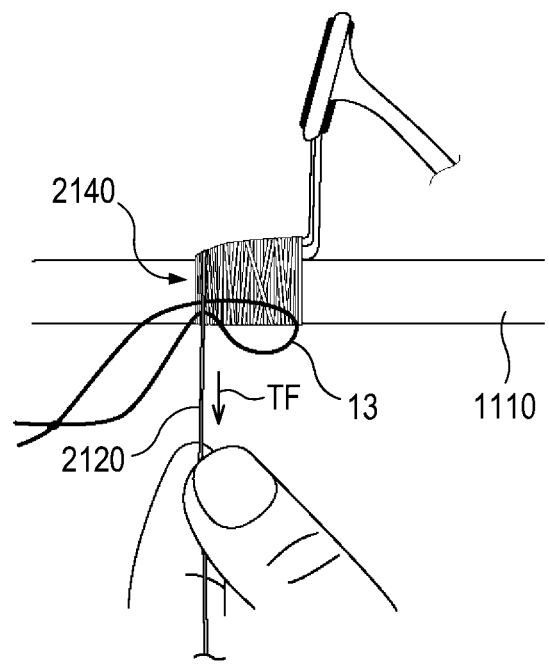
FIG. 23A is a side view showing another example of the process of completing an outer wrapping portion.
Figure 23B:
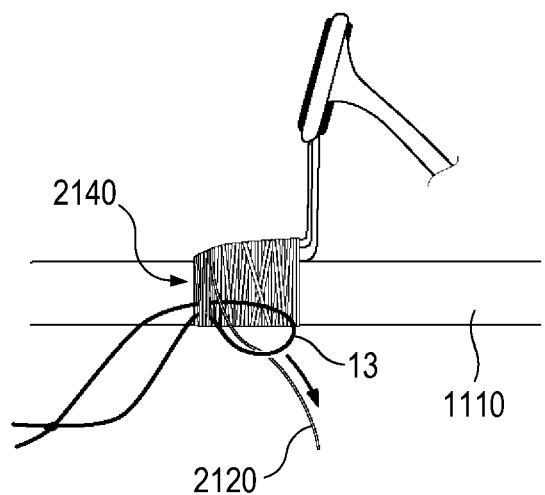
FIG. 23B is a side view showing a process subsequent to the process shown in FIG. 23A.
Figure 23C:
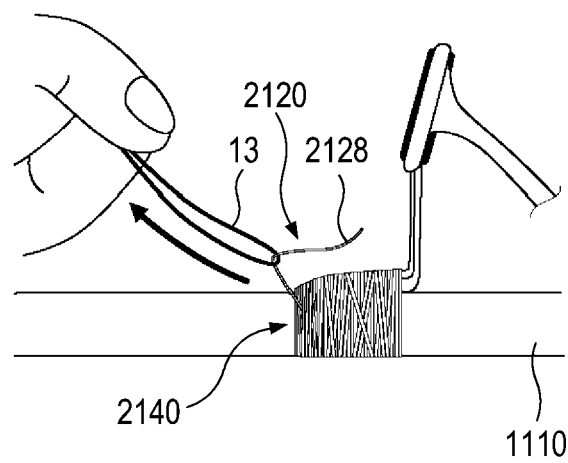
FIG. 23C is a side view showing a process subsequent to the process shown in FIG. 23B.
Figure 23D:
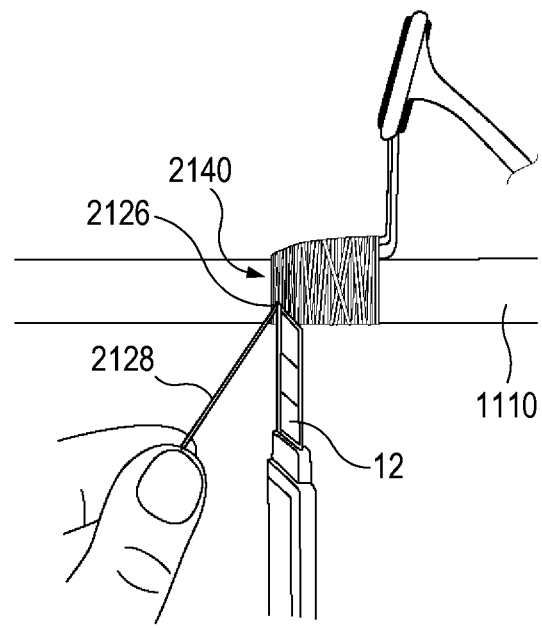
FIG. 23D is a side view showing a process subsequent to the process shown in FIG. 23C.

As shown in FIG. 23A, to complete the outer wrapping portion 2140, the yarn loop 13 is inserted between the already-wound single twist yarn and the not-yet-wound single twist yarn. Thereafter, the single twist yarn 2120 is further wound by a plural number of winding turns so as to cover the yarn loop 13. Next, as shown in FIG. 23B, the single twist yarn 2120 is passed through the yarn loop 13. Next, as shown in FIG. 23C, the yarn loop 13 holding the single twist yarn 2120 is pulled out of the outer wrapping portion 2140. Therefore, a portion 2128 of the single twist yarn protrudes from the outer wrapping portion 2140 in the state of being covered by the single twist yarn. Next, as shown in FIG. 23D, the portion 2128 of the single twist yarn protruding from the outer wrapping portion 2140 is cut by the cutter 12, and the outer wrapping portion 2140 is completed. Further, the last portion of the single twist yarn, which is cut by the cutter 12, becomes a cut terminal end portion 2126 of the single twist yarn, and the cut terminal end portion 2126 of the single twist yarn is fixed to the inside of the outer wrapping portion 2140. The fixing manner shown in FIGS. 23A to 23D may be used for completing the wrapping portion shown in FIG. 20D.

The process shown in FIG. 21B exemplarily shows cutting a portion of the single twist yarn that protrudes from the inner wrapping portion 2130. In another embodiment, when the inner wrapping portion is formed, the process of cutting a portion of the initial portion of the single twist yarn may be omitted. In this regard, reference is made to FIG. 24 showing a process similar to the process shown in FIG. 21A.

Figure 24:
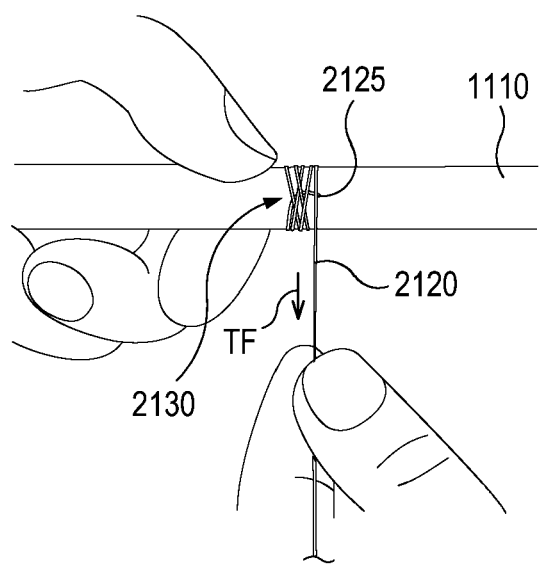
FIG. 24 is a side view showing another example of the process of forming an inner wrapping portion.

Referring to FIG. 24, the single twist yarn 2120 is wound around the outer peripheral surface of the rod body 1110, forming the inner wrapping portion 2130 that fixes the cut tip end portion 2125 of the single twist yarn (the initial portion of the single twist yarn). Since the tension force TF is applied to the single twist yarn 2120, the single twist yarn 2120 has the crushed and flattened cross-sectional shape, and the single twist yarn 2120 is in contact with the outer peripheral surface of the rod body 1110 with a wider contact area. Thus, as the single twist yarn is wound to be overlapped with the cut tip end portion 2125 such that the initial portion of the single twist yarn (the cut tip end portion 2125) is covered by the single twist yarn, the cut tip end portion 2125 of the single twist yarn can be fixed without being unwound. Accordingly, it is not necessary to cut a portion of the initial portion of the single twist yarn. Even if the single twist yarn 2120 is wound overlappingly, the outer surface of the wound single twist yarn is flat due to the tension force. Therefore, when the attachment foot of the fishing line guide is positioned on the outer peripheral surface of the rod body 1110, a problem such as rattling or tilting of the fishing line guide is not caused.

Figure 25:
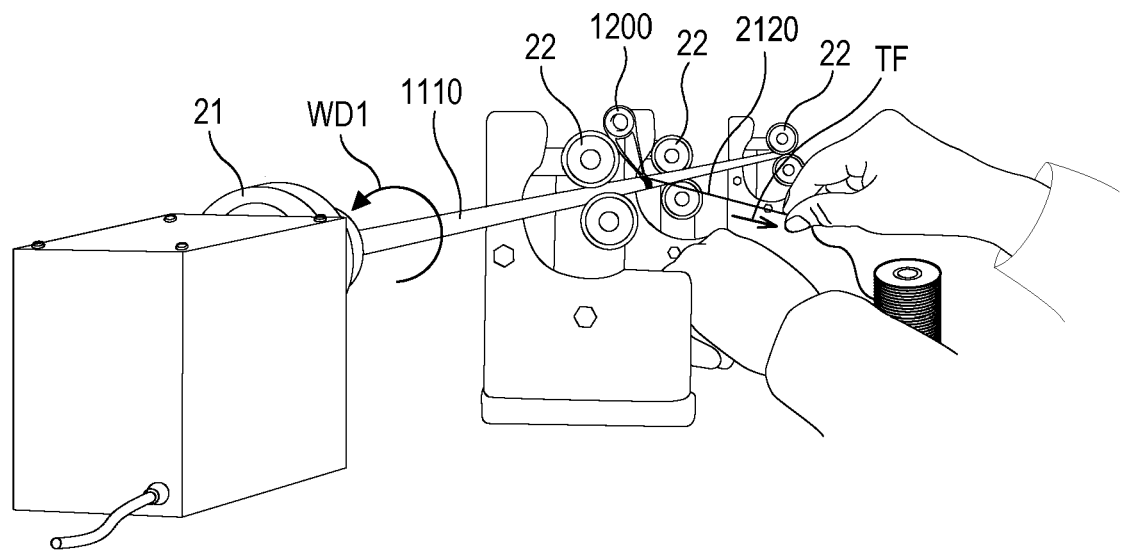
FIG. 25 illustrates a task of winding a single twist yarn in order to fix a fishing line guide to a rod body of a fishing rod by a component fixing method according to one embodiment.

FIG. 25 illustrates a task of winding the single twist yarn in order to fix the fishing line guide to the rod body of the fishing rod by the component fixing method according to one embodiment. Referring to FIG. 25, in the state where the attachment foot of the fishing rod component (e.g., the fishing line guide 1200) is placed on the outer peripheral surface of the rod body 1110, the fishing line guide 1200 is fixed to the outer peripheral surface of the rod body 1110 by using the single twist yarn 2120. One end of the rod body 1110 is clamped by a rotator 21, and may be supported by a plurality of support rollers 22. As the rotator 21 is rotated in a direction of an arrow WD1, the rod body 1110 is rotated together with the fishing line guide 1200. Due to the rotation of the rod body 1110, the single twist yarn 2120 is wound around the rod body 1110 and the attachment foot of the fishing line guide 1200. The tension force TF is applied to the single twist yarn 2120. As a worker pulls the single twist yarn 2120 with his or her fingers, the tension force TF can be applied to and maintained in the single twist yarn 2120. Applying the tension force to the single twist yarn 2120 is not limited to the example shown in FIG. 25, and the tension force may be applied to the single twist yarn 2120 by a mechanism configured to release the single twist yarn 2120. Instead of the support rollers 22, the rod body 1110 may be supported on a support table having a V-shaped groove. Unlike the example shown in FIG. 25, the single twist yarn 2120 may be wound around the rod body 1110 or the rod body 1110 and the attachment foot of the fishing line guide 1200 while the single twist yarn 2120 is turned with respect to the rod body 1110 in the state where the rod body 1110 is fixed to a support table.

Figure 26:
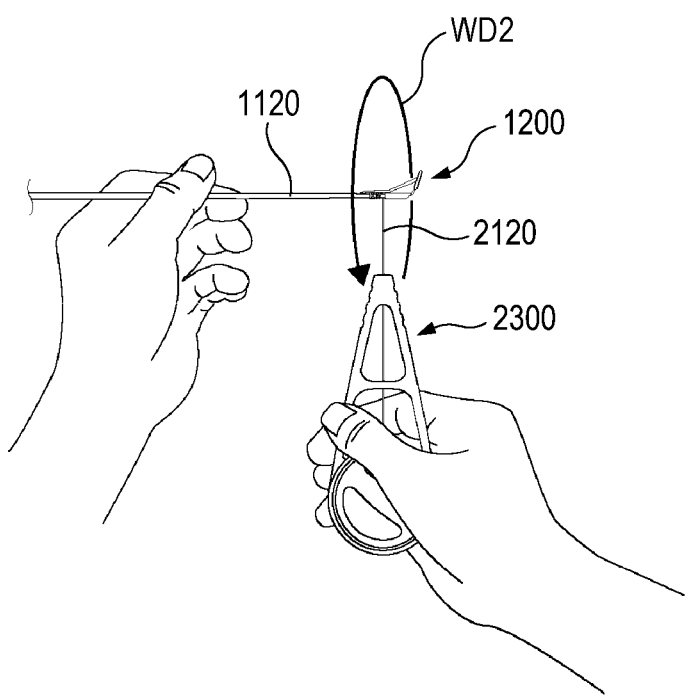
FIG. 26 is a side view showing an embodiment of a component fixing method using an auxiliary tool.
Figure 27:
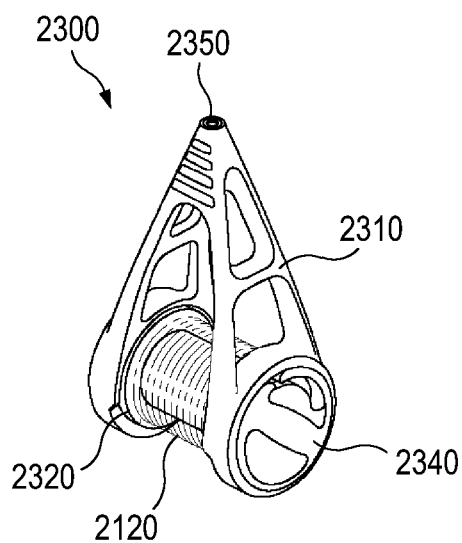
FIG. 27 is a perspective view of the auxiliary tool shown in FIG. 26.
Figure 28:
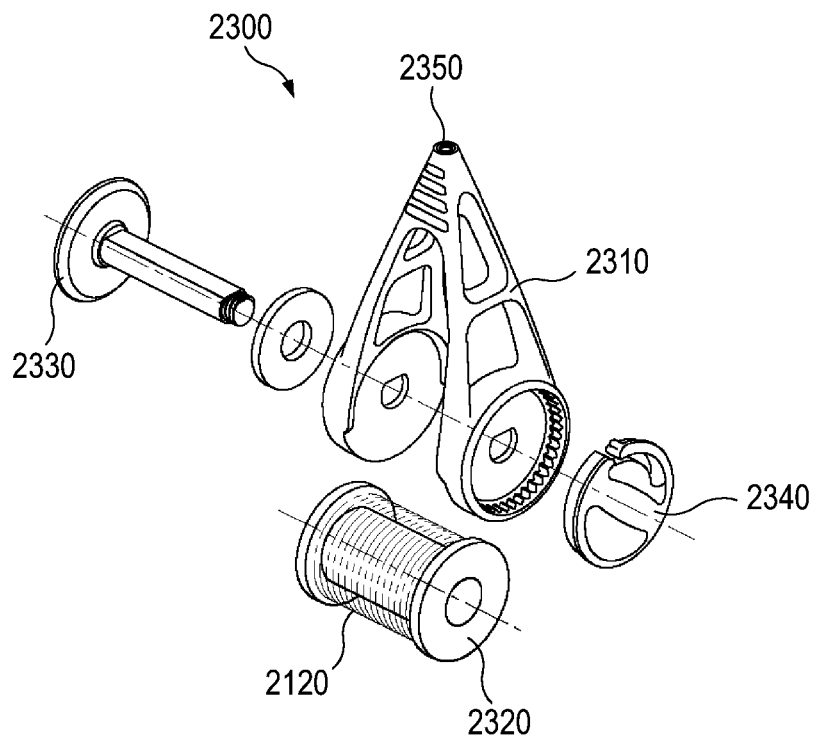
FIG. 28 is an exploded perspective view of the auxiliary tool shown in FIG. 26.

The rod body disposed at a tip side of the fishing rod can bend to a large degree. If such a rod body is rotated in the process of fixing the component to the rod body disposed at the tip side of the fishing rod, the rod body can be heavily shaken due to a centrifugal force. The task of winding a wrapping yarn around the rod body disposed at the tip side in the regularly wound form requires a worker to have a high degree of proficiency. However, according to the component fixing method of one embodiment, the fishing rod component can be fixed to the rod body disposed at the tip side by using the single twist yarn, and the single twist yarn can be wound in the irregularly wound form. Further, an auxiliary tool may be used for winding the single twist yarn around the rod body disposed at the tip side. FIGS. 26 to 28 show an embodiment of the component fixing method using an auxiliary tool.

Referring to FIG. 26, a rod body 1120 of the fishing rod is disposed at the tip side of the fishing rod. The fishing line guide 1200 is fixed to a tip end of the rod body 1120 so as to protrude from the rod body 1120. To fix the fishing line guide 1200 to the rod body 1120, the single twist yarn 2120 is wound around the attachment foot of the fishing line guide 1200 and the rod body 1120 like the above-described embodiment, and therefore the wrapping portion composed of the single twist yarn is formed. Further, an auxiliary tool 2300 configured to release the single twist yarn 2120 is used for winding the single twist yarn 2120. The rod body 1120 is not rotated, and the auxiliary tool 2300 is turned about the rod body 1120 while stretching the single twist yarn 2120 by a tension force. Therefore, the wrapping portion, which is composed of the single twist yarn 2120 stretched by the tension force and is configured to wrap the attachment foot of the fishing line guide 1200 and the rod body 1120, is formed. That is, in the component fixing method according to one embodiment, forming the wrapping portion may be performed by using the auxiliary tool 2300 configured to release the single twist yarn 2120.

While the auxiliary tool 2300 is turned about the rod body 1120 as shown by an arrow WD2, the single twist yarn 2120 is wound in the irregularly wound form. Due to the auxiliary tool 2300, the rod body 1120 can be wrapped by the single twist yarn 2120 without shaking. The worker can hold the auxiliary tool 2300 with his or her palm, and can apply the tension force to the single twist yarn 2120 by pulling the auxiliary tool 2300. Since the auxiliary tool 2300 is used, the worker cannot perform a delicate manipulation. However, since the single twist yarn 2120 stretched by the tension force is wound in the irregularly wound form, a delicate manipulation is not required for the worker, and the task of winding the single twist yarn 2120 around the rod body 1120 and the fishing line guide 1200 can be easily performed by means of the auxiliary tool 2300. When the worker releases the auxiliary tool 2300 in the state where the single twist yarn 2120 is wound by the auxiliary tool 2300, the wound state of the single twist yarn 2120 does not become loosened due to the weight of the auxiliary tool 2300.

The auxiliary tool 2300 may be used in all the process for forming the wrapping portion shown in FIGS. 20A to 21E. Further, the auxiliary tool 2300 may be used in order to fix the fishing line guide to the tip end of the rod body 1120, and in order to fix the fishing line guide to any location of the rod body 1120. Further, the auxiliary tool 2300 is not limited in its usage to the rod body 1120 disposed at the tip side of the fishing rod, and may be used for fixing the fishing rod component to another rod body of the fishing rod.

FIG. 27 is a perspective view of the auxiliary tool shown in FIG. 26, and FIG. 28 is an exploded perspective view of the auxiliary tool shown in FIG. 26. Referring to FIGS. 27 and 28, the auxiliary tool 2300 according to one embodiment includes a yoke-shaped frame 2310, a spool 2320 disposed at one end of the frame 2310, a shaft portion 2330 for rotatably coupling the spool 2320 to the frame 2310, and a bearing portion 2340 coupled to one end of the shaft portion 2330 and the frame 2310. The single twist yarn 2120 is wound around the spool 2320 and is unwound from the spool 2320. A guide ring 2350 is coupled to the opposite end of the frame 2310. The single twist yarn 2120 is released outward from the spool 2320 through the guide ring 2350. The guide ring 2350 is made of a ceramic material and prevents damage of the single twist yarn 2120. The shaft portion 2330 and the bearing portion 2340 are threadedly coupled to each other. Since the shaft portion 2330 and the bearing portion 2340 are threadedly coupled, the clamping force of the spool 2320 can be relieved and the tension force of the single twist yarn 2120 can be adjusted.

Tests were conducted for checking the fixing force of the fishing rod component (e.g., fishing line guide), which is fixed to the rod body by the component fixing tool and the component fixing method according to the embodiments of the present disclosure. Table 1 below shows the results of the fixing force checking tests. In Table 1 below, a test example 1 and a comparative example 1 in a test 1 relate to a rod body having the same diameter and a fishing line guide having the same size. In Table 1 below, a test example 2 and a comparative example 2 in a test 2 relate to a rod body having a diameter different from the rod body in the test 1 and a fishing line guide having a size different from the fishing line guide in the test 1. The test example 1 and the test example 2 mean examples where the fishing line guide is fixed to the rod body by using the single twist yarn according to one embodiment. The single twist yarn in the test example 1 and the test example 2 is wound around the attachment foot and the rod body in the irregularly wound form in the state of being stretched by a tension force. The comparative example 1 and the comparative example 2 mean examples where the fishing line guide is fixed to the rod body by using the folded yarn. The folded yarn in the comparative example 1 and the comparative example 2 is wound around the attachment foot and the rod body in the regularly wound form. Each test was conducted in a state where the coating portion is formed after the single twist yarn is wound around the attachment foot and the rod body, and in a state where the coating portion is formed after the folded yarn is wound around the attachment foot and the rod body.

TABLE 1

|  |  | Fixing strength of attachment foot (N) | Strength ratio (%) |
| --- | --- | --- | --- |
| Test 1 | Comparative example 1 | 78 | 100% |
|  | Test example 1 | 110 | 141% |
| Test 2 | Comparative example 2 | 301 | 100% |
|  | Test example 2 | 297 | 99% |

From Table 1 above, it can be confirmed that the fixing forces between the component and the rod body in the test example 1 and the test example 2 do not show a difference from the fixing forces in the comparative example 1 and the comparative example 2.

The technical idea of the present disclosure has been described heretofore with reference to some embodiments and examples shown in the accompanying drawings. However, it is to be understood that various substitutions, modifications and alterations may be made without departing from the technical idea and scope of the present disclosure that can be understood by those of ordinary skill in the technical field to which the present disclosure pertains. Further, it is to be understood that such substitutions, modifications and alterations fall within the scope of the appended claims.

What is claimed is:

1. A component fixing tool configured to fix a fishing rod component having an attachment foot to a rod body, comprising:
a wrapping portion composed of a single twist yarn, which is wound around an outer surface of the attachment foot and an outer peripheral surface of the rod body by a multiple number of winding turns in a state where the attachment foot is placed on the outer peripheral surface of the rod body, and configured to wrap the attachment foot and the rod body,
wherein the single twist yarn is formed by twisting a strand of single yarn in one direction and is deformed by a tension force so as to have a cross-sectional shape having a width larger than a thickness,
wherein the single twist yarn is wound around the outer surface of the attachment foot and the outer peripheral surface of the rod body in a state of being stretched by the tension force,
wherein the single twist yarn is wound such that a one-turn wound portion of the single twist yarn stretched by the tension force and another one-turn wound portion of the single twist yarn stretched by the tension force form an angle with respect to each other, and
wherein the wrapping portion includes:
an overlapped portion in which two adjacent one-turn wound portions of the single twist yarn stretched by the tension force are at least partially overlapped with each other along a longitudinal direction of the rod body; and
a flat outer surface portion partially defined by outer surfaces of the two adjacent one-turn wound portions stretched by the tension force.

2. The component fixing tool of claim 1, wherein the one-turn wound portion of the single twist yarn has a flat contact surface that is in contact with the outer surface of the attachment foot and the outer peripheral surface of the rod body by surface contact in the state of being stretched by the tension force.

3. The component fixing tool of claim 1, wherein the wrapping portion includes:
an inner wrapping portion composed of the single twist yarn, which is wound around the outer peripheral surface of the rod body with a length shorter than a length of the attachment foot by a plural number of winding turns and is fixed to the outer peripheral surface, and configured to form a gap between an inner surface of the attachment foot and the outer peripheral surface of the rod body; and
an outer wrapping portion composed of the single twist yarn, which is wound around the inner wrapping portion, the outer surface of the attachment foot, and the outer peripheral surface of the rod body by a multiple number of winding turns, and configured to cover and hide the inner wrapping portion,
wherein the inner wrapping portion and the outer wrapping portion are continuously composed of a strand of the single twist yarn.

4. The component fixing tool of claim 3, wherein the single twist yarn in the inner wrapping portion is wound around the outer peripheral surface of the rod body so as to form a gap between the two adjacent one-turn wound portions,
wherein a cut tip end portion of the single twist yarn is fixed to the inner wrapping portion, and
wherein a cut terminal end portion of the single twist yarn is fixed to the outer wrapping portion.

5. The component fixing tool of claim 3, wherein the outer wrapping portion has a tip end portion that has a length of more than 0 mm and less than or equal to 2 mm in a direction of being spaced away from a tip end of the attachment foot along the outer peripheral surface of the rod body.

6. The component fixing tool of claim 1, wherein the wrapping portion has a tip end portion between a vertical surface formed in a tip end of the attachment foot and the outer peripheral surface of the rod body, and wherein the single twist yarn is wound into a plurality of layers and is stacked in the tip end portion.

7. The component fixing tool of claim 1, further comprising a coating portion coated so as to cover the flat outer surface portion of the wrapping portion and composed of a synthetic resin material.

8. A component fixing method of fixing a fishing rod component having an attachment foot to a rod body, comprising:
forming a wrapping portion configured to wrap the attachment foot and the rod body by winding a single twist yarn, which is formed by twisting a strand of single yarn in one direction and is deformed by a tension force, around an outer surface of the attachment foot and an outer peripheral surface of the rod body by a multiple number of winding turns in a state where the attachment foot is placed on the outer peripheral surface of the rod body while stretching the single twist yarn by the tension force such that a cross-sectional shape of the single twist yarn has a width larger than a thickness; and
completing the wrapping portion by fixing the single twist yarn to the wrapping portion,
wherein forming the wrapping portion is performed such that:
a one-turn wound portion of the single twist yarn stretched by the tension force and another one-turn wound portion of the single twist yarn stretched by the tension force form an angle with respect to each other;
an overlapped portion, in which two adjacent one-turn wound portions of the single twist yarn stretched by the tension force are at least partially overlapped with each other along a longitudinal direction of the rod body, is formed; and
a flat outer surface portion, which is partially defined by flat outer surfaces of the two adjacent one-turn wound portions stretched by the tension force, is formed.

9. The component fixing method of claim 8, wherein forming the wrapping portion is performed such that the one-turn wound portion of the single twist yarn is in contact with the outer surface of the attachment foot and the outer peripheral surface of the rod body by surface contact through a flat contact surface in a state where the single twist yarn is stretched by the tension force.

10. The component fixing method of claim 8, wherein forming the wrapping portion is performed such that the single twist yarn is wound around the outer surface of the attachment foot and the outer peripheral surface of the rod body in any one advance direction of a first advance direction toward a tip end of the attachment foot and a second advance direction toward a base end of the attachment foot.

11. The component fixing method of claim 8, wherein forming the wrapping portion includes:
forming an inner wrapping portion by winding the single twist yarn around the outer peripheral surface of the rod body with a length shorter than a length of the attachment foot by a plural number of winding turns so as to form a gap between an inner surface of the attachment foot and the outer peripheral surface of the rod body;
temporarily fixing the attachment foot to the outer peripheral surface of the rod body by winding the single twist yarn connected from the inner wrapping portion on the outer surface of the attachment foot; and forming an outer wrapping portion configured to cover the inner wrapping portion, the outer surface of the attachment foot, and the outer peripheral surface of the rod body by winding the single twist yarn, which is connected from the inner wrapping portion, around the inner wrapping portion, the outer surface of the attachment foot, and the outer peripheral surface of the rod body by a multiple number of winding turns, and wherein forming the inner wrapping portion, temporarily fixing the attachment foot, and forming the outer wrapping portion are performed by using a strand of the single twist yarn.

12. The component fixing method of claim 11, wherein forming the inner wrapping portion is performed so as to fix a cut tip end portion of the single twist yarn to the inner wrapping portion and so as to form a gap between the two adjacent one-turn wound portions of the single twist yarn.

13. The component fixing method of claim 11, wherein forming the outer wrapping portion is performed so as to form a tip end portion that has a length of more than 0 mm and less than or equal to 2 mm in a direction of being spaced away from a tip end of the attachment foot along the outer peripheral surface of the rod body.

14. The component fixing method of claim 8, wherein forming the wrapping portion is performed so as to form a tip end portion, which is formed by winding the single twist yarn into a plurality of layers and stacking the single twist yarn, between a vertical surface formed in a tip end of the attachment foot and the outer peripheral surface of the rod body.

15. The component fixing method of claim 8, wherein completing the wrapping portion includes fixing the single twist yarn to the wrapping portion by a knot.

16. The component fixing method of claim 8, wherein forming the wrapping portion is performed by using an auxiliary tool, which has a spool with the single twist yarn wound thereon and is configured to release the single twist yarn.

17. The component fixing method of claim 8, further comprising forming a coating portion covering the flat outer surface portion of the wrapping portion by coating the flat outer surface portion with a synthetic resin material.

* * * * *